(12) United States Patent
Jang et al.

(10) Patent No.: US 11,468,306 B2
(45) Date of Patent: Oct. 11, 2022

(54) STORAGE DEVICE WITH ARTIFICIAL INTELLIGENCE AND STORAGE SYSTEM INCLUDING THE SAME

(71) Applicant: Samsung Electronics Co., Ltd., Suwon-si (KR)

(72) Inventors: Jaehun Jang, Hwaseong-si (KR); Hongrak Son, Anyang-si (KR); Changkyu Seol, Osan-si (KR); Hyejeong So, Hwaseong-si (KR); Hwaseok Oh, Yongin-si (KR); Pilsang Yoon, Hwaseong-si (KR); Jinsoo Lim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 298 days.

(21) Appl. No.: 16/906,209

(22) Filed: Jun. 19, 2020

(65) Prior Publication Data
US 2021/0150321 A1 May 20, 2021

(30) Foreign Application Priority Data
Nov. 18, 2019 (KR) .................. 10-2019-0147552

(51) Int. Cl.
| | |
|---|---|
| *G06N 3/063* | (2006.01) |
| *G06F 15/80* | (2006.01) |
| *G06F 7/544* | (2006.01) |
| *G06N 3/08* | (2006.01) |

(52) U.S. Cl.
CPC .......... *G06N 3/063* (2013.01); *G06F 7/5443* (2013.01); *G06F 15/80* (2013.01); *G06N 3/08* (2013.01)

(58) Field of Classification Search
None
See application file for complete search history.

(56) References Cited

U.S. PATENT DOCUMENTS

| | | |
|---|---|---|
| 5,740,326 A | 4/1998 | Boulet et al. |
| 8,065,244 B2 | 11/2011 | Chen et al. |
| 8,131,912 B2 | 3/2012 | Ozawa et al. |
| 9,324,321 B2 | 4/2016 | Xue et al. |
| 9,338,065 B2 | 5/2016 | Vasseur et al. |
| 9,801,095 B2 | 10/2017 | Henderson et al. |
| 9,836,277 B2 * | 12/2017 | Guz ........................ G06F 11/30 |
| 10,042,762 B2 * | 8/2018 | Jayasena ............. G06F 12/0811 |
| 10,445,638 B1 * | 10/2019 | Amirineni ............ G06N 3/0454 |

(Continued)

*Primary Examiner* — Eric Coleman
(74) *Attorney, Agent, or Firm* — Harness, Dickey & Pierce, P.L.C.

(57) ABSTRACT

A storage system includes a host device and a storage device. The host device provides first input data for data storage function and second input data for artificial intelligence (AI) function. The storage device stores the first input data from the host device, and performs AI calculation based on the second input data to generate calculation result data. The storage device includes a first processor, a first nonvolatile memory, a second processor and a second nonvolatile memory. The first processor controls an operation of the storage device. The first nonvolatile memory stores the first input data. The second processor performs the AI calculation, and is distinguished from the first processor. The second nonvolatile memory stores weight data associated with the AI calculation, and is distinguished from the first nonvolatile memory.

20 Claims, 20 Drawing Sheets

(56) References Cited

U.S. PATENT DOCUMENTS

2005/0216519 A1     9/2005   Mayo et al.
2017/0286830 A1    10/2017   El-Yaniv et al.
2018/0075344 A1*   3/2018   Ma ...................... G06N 3/0481
2019/0042920 A1*   2/2019   Akin .................... G06N 3/0481
2019/0087708 A1*   3/2019   Goulding ............... G06N 3/082

* cited by examiner

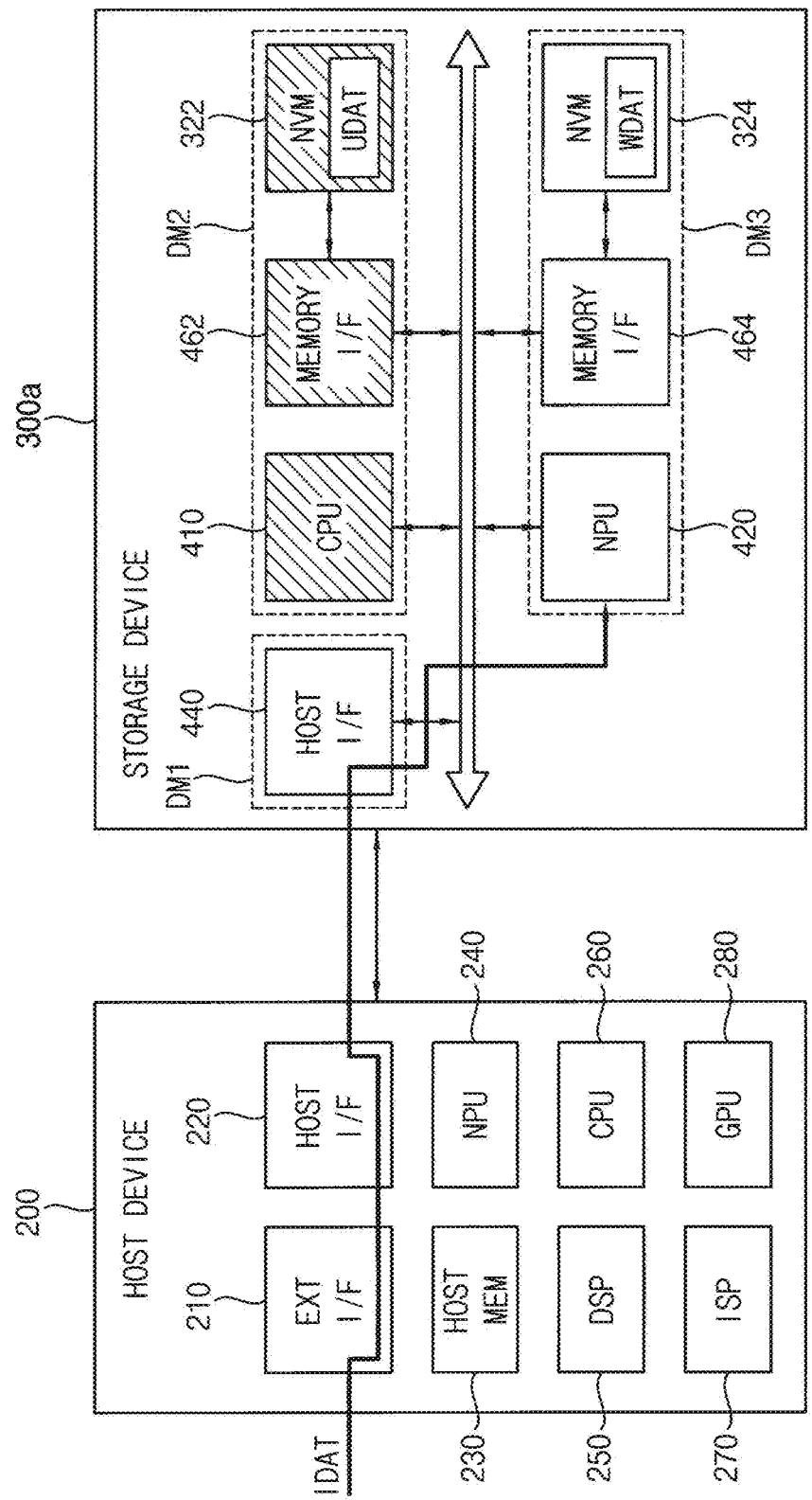

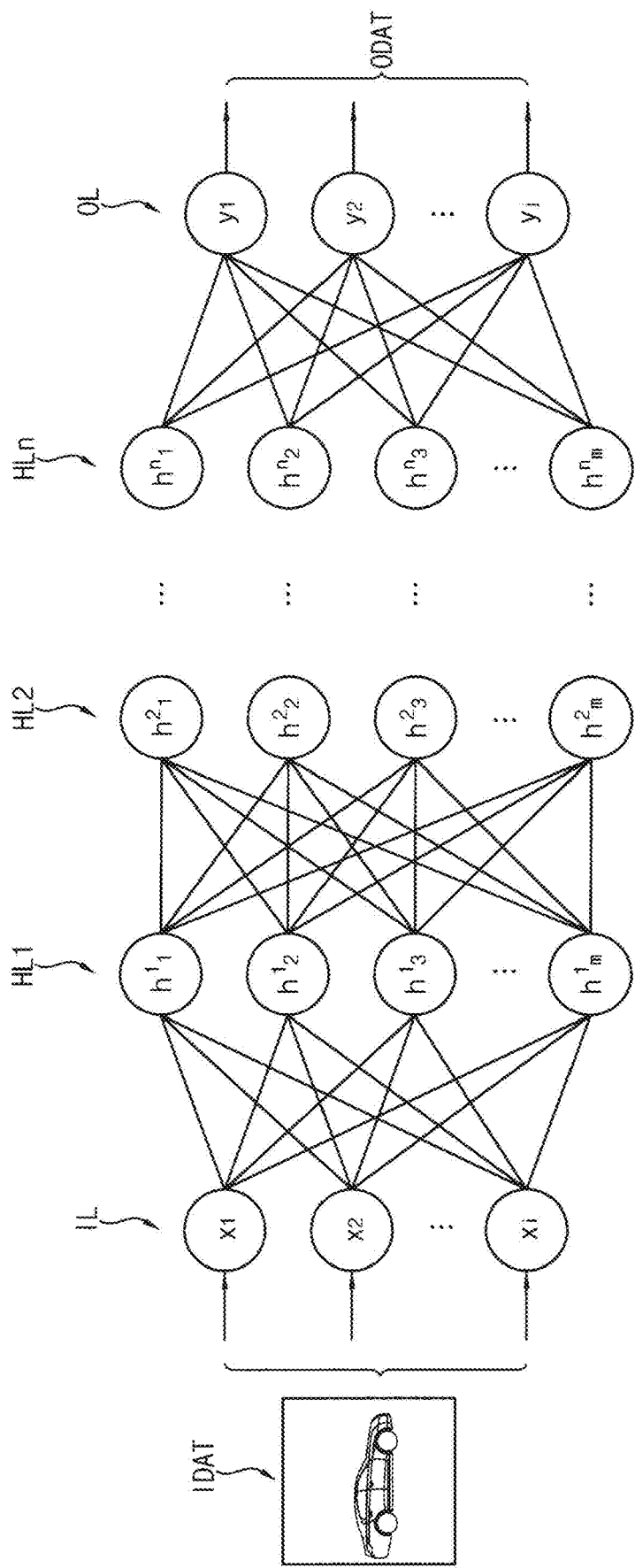

STORAGE DEVICE WITH ARTIFICIAL INTELLIGENCE AND STORAGE SYSTEM INCLUDING THE SAME

CROSS-REFERENCE TO RELATED APPLICATION

This application claims priority under 35 USC § 119 to Korean Patent Application No. 10-2019-0147552, filed on Nov. 18, 2019 in the Korean Intellectual Property Office (KIPO), the contents of which are herein incorporated by reference in their entirety.

BACKGROUND

1. Technical Field

Example embodiments relate generally to semiconductor integrated circuits, and more particularly to storage devices with artificial intelligence (AI) and storage systems including the storage devices.

2. Description of the Related Art

A storage system includes a host device and a storage device. The storage device may be a memory system including a memory controller and a memory device or including only a memory device. In the storage system, the host device and the storage device are connected to each other via various interface standards such as, for example, universal flash storage (UFS), serial advanced technology attachment (SATA), small computer system interface (SCSI), serial attached SCSI (SAS), embedded multi-media card (eMMC), etc.

In computer science, artificial intelligence (AI), sometimes called machine intelligence, is intelligence demonstrated by machines, in contrast to the natural intelligence displayed by, for example, humans. Colloquially, the term "AI" is often used to describe machines (e.g., computers) that mimic "cognitive" functions associated with the human mind, such as "learning" and "problem solving". For example, AI may be implemented based on a machine learning, a neural network, an artificial neural network (ANN), or the like. The ANN is obtained by engineering a cell structure model of a human brain where a process of recognizing a pattern is performed. The ANN refers to a calculation model that is based on software and/or hardware and is designed to imitate biological calculation abilities by applying many artificial neurons interconnected through connection lines. The human brain consists of neurons that are basic units of a nerve, and encrypts or decrypts information according to different types of dense connections between these neurons. Artificial neurons in the ANN are obtained through simplification of biological neuron functionality. The ANN performs a cognition or learning process by interconnecting the artificial neurons having connection intensities. Recently, data processing based on the AI and/or the ANN have been researched.

SUMMARY

At least one example embodiment of the present disclosure provides a storage system including a storage device with artificial intelligence (AI) capable of improving or enhancing the operating efficiency and reducing the power consumption.

At least one example embodiment of the present disclosure provides a storage device with AI capable of improving or enhancing the operating efficiency and reducing the power consumption.

According to an example embodiment, a storage system includes a host device and a storage device. The host device provides first input data and second input data. The storage device is configured to store the first input data and to perform AI calculation based on the second input data. The storage device includes a first processor, a first nonvolatile memory, a second processor and a second nonvolatile memory. The first processor controls an operation of the storage device. The first nonvolatile memory stores the first input data. The second processor performs the AI calculation, and is different from the first processor. The second nonvolatile memory stores weight data associated with the AI calculation, and is different from the first nonvolatile memory.

According to an example embodiment, a storage device includes a first processor, a first nonvolatile memory, a second nonvolatile memory and a second processor. The first processor is configured to control an operation of the storage device. The first nonvolatile memory is configured to store first input data for the data storage function. The second nonvolatile memory is configured to store weight data associated with artificial intelligence (AI) calculation, and is different from the first nonvolatile memory. The second processor is configured to perform AI function, and is different from the first processor. The second processor is configured to load the weight data stored in the second nonvolatile memory, perform the AI calculation based on second input data and the weight data, and output the calculation result data.

According to an example embodiment, a storage system includes a first clock/power domain including a first processor and a first nonvolatile memory, a second clock/power domain including a second processor and a second nonvolatile memory, and a third clock/power domain including a triggering unit. The first nonvolatile memory is configured to store first input data in a first operation mode. The second nonvolatile memory is configured to store weight data associate with an artificial intelligence (AI) calculation, the second nonvolatile memory being different from the first nonvolatile memory, and the second processor is configured to perform the AI calculation based on second input data in a second operation mode, and is different from the first processor. The third clock/power domain includes a triggering unit, and is being different from the first and second clock/power domains. The triggering unit is configured to enable the first operation mode and the second operation mode. The triggering unit is configured to enable the first processor and the first nonvolatile memory to store the first input data and the second processor and the second nonvolatile memory to have an idle state in the first operation mode, and to enable the second processor to load the weight data stored in the second nonvolatile memory, to perform the AI calculation based on second input data and the weight data, and output the calculation result data in the second operation mode.

The storage device with AI and the storage system according to example embodiments may further include the second processor that performs the AI function and the AI calculation. The second processor may be separated or distinct from the first processor that controls the operation of the storage device. The AI function of the storage device may be performed independently of the control of the host device, and may be performed by the storage device by itself. The storage device may receive only the second input data, which is a target of the AI calculation, and may output only the calculation result data, which is a result of the AI calculation. Accordingly, the data traffic between the host device and the storage device may be reduced. In addition, the first and second processors may be separated from each other, and the nonvolatile memories accessed by the first and second processors may also be separated from each other, thereby reducing the power consumption.

BRIEF DESCRIPTION OF THE DRAWINGS

Illustrative, non-limiting example embodiments will be more clearly understood from the following detailed description taken in conjunction with the accompanying drawings.

FIGS. 4, 5A, 5B and 5C are diagrams for describing an operation of the storage system of FIG. 1.

FIGS. 6A, 6B and 6C are diagrams for describing examples of a network structure that is driven by an AI function implemented in a storage device according to some example embodiments.

DETAILED DESCRIPTION OF THE EMBODIMENTS

Figure 1:
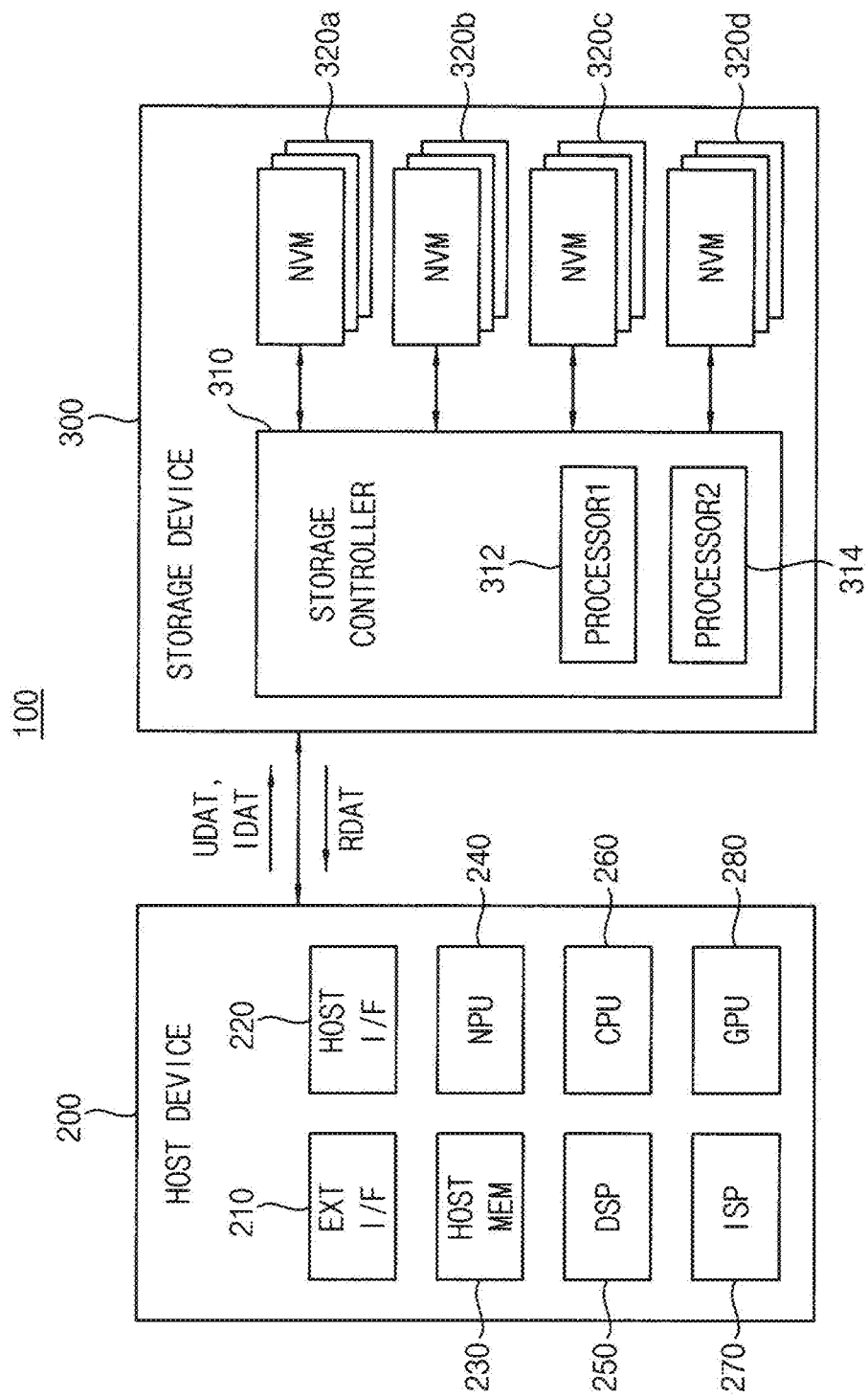
FIG. 1 is a block diagram illustrating a storage device and a storage system including the storage device according to some example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a storage device and a storage system including the storage device according to some example embodiments.

Referring to FIG. 1, a storage system 100 includes a host device 200 and a storage device 300.

The host device 200 is configured to control the overall operations of the storage system 100. The host device 200 may include an external interface (EXT I/F) 210, a host interface (HOST I/F) 220, a host memory (HOST MEM) 230, a neural processing unit (NPU) 240, a digital signal processor (DSP) 250, a central processing unit (CPU) 260, an image signal processor (ISP) 270, and a graphic processing unit (GPU) 280.

The external interface 210 may be configured to exchange data, signals, events, or the like with an outside of the storage system 100. For example, the external interface 210 may include an input device such as a keyboard, a keypad, a button, a microphone, a mouse, a touchpad, a touch-screen, a remote controller, etc., and an output device such as a printer, a speaker, a display, etc.

The host interface 220 may be configured to provide physical connections between the host device 200 and the storage device 300. For example, the host interface 220 may provide an interface corresponding to a bus format of the host device 200 for communication between the host device 200 and the storage device 300. In some example embodiments, the bus format of the host device 200 may be a universal flash storage (UFS) and/or a nonvolatile memory express (NVMe). In other example embodiments, the bus format of the host device 200 may be a small computer system interface (SCSI), a serial attached SCSI (SAS), a universal serial bus (USB), a peripheral component interconnect express (PCIe), an advanced technology attachment (ATA), a parallel ATA (PATA), a serial ATA (SATA), or the like.

The NPU 240, the DSP 250, the CPU 260, the ISP 270 and the GPU 280 may be configured to control an operation of the host device 200, and may process data associated with the operation of the host device 200.

For example, the CPU 260 may be configured to control overall operations of the host device 200, and may execute an operating system (OS). For example, the OS executed by the CPU 260 may include a file system for file management, and a device driver configured to control peripheral devices including the storage device 300 at the OS level. The DSP 250 may be configured to process digital signals. The ISP 270 may be configured to process image signals. The GPU 280 may be configured to process various data associated with graphics.

The NPU 240 may be configured to execute and drive a neural network system, and may process corresponding data. In addition to the NPU 240, at least one of the DSP 250, the CPU 260, the ISP 270 and the GPU 280 may also be configured to execute and drive the neural network system. Thus, the NPU 240, the DSP 250, the CPU 260, the ISP 270 and the GPU 280 may be referred to as a plurality of processing elements (PEs), a plurality of resources or a plurality of accelerators for driving the neural network system, and may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The host memory 230 may be configured to store instructions and/or data that are executed and/or processed by the NPU 240, the DSP 250, the CPU 260, the ISP 270 and/or the GPU 280. For example, the host memory 230 may include at least one of various volatile memories such as a dynamic random access memory (DRAM), static random access memory (SRAM), or the like.

In some example embodiments, the host device 200 may be an application processor (AP). For example, the host device 200 may be implemented in the form of a system-on-chip (SoC).

The host device may be configured to access the storage device 300. The storage device 300 may include a storage controller 310 and a plurality of nonvolatile memories (NVMs) 320a, 320b, 320c and 320d. Although illustrated as including four NVMs, the example embodiments are not so limited, and may comprising more or fewer NVMs, for example five or more.

The storage controller 310 may be configured to control an operation of the storage device 300 and/or operations of the plurality of nonvolatile memories 320a, 320b, 320c and 320d based on a command, an address, and data that are received from the host device 200. A configuration of the storage controller 310 will be described with reference to FIG. 2.

The plurality of nonvolatile memories 320a, 320b, 320c and 320d may be configured to store the plurality of data. For example, the plurality of nonvolatile memories 320a, 320b, 320c and 320d may store metadata, various user data, or the like.

In some example embodiments, each of the plurality of nonvolatile memories 320a, 320b, 320c and 320d may include a NAND flash memory. In other example embodiments, each of the plurality of nonvolatile memories 320a, 320b, 320c and 320d may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

In some example embodiments, the storage device 300 may include a universal flash storage (UFS), a multimedia card (MMC) or an embedded multimedia card (eMMC). In other example embodiments, the storage device 300 may include one of a solid state drive (SSD), a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, a UFS, an eMMC, an NVMe bus, a SATA bus, a SCSI bus, a SAS bus, or the like. The storage device 300 may be configured to use a block accessible address space corresponding to an access size of the plurality of nonvolatile memories 320a, 320b, 320c and 320d to provide the block accessible interface to the host device 200, for allowing the access by units of a memory block with respect to data stored in the plurality of nonvolatile memories 320a, 320b, 320c and 320d.

In some example embodiments, the storage system 100 may be included in at least one of various mobile systems, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, drone, etc. In other example embodiments, the storage system 100 may be included in at least one of various computing systems, such as a personal computer (PC), a server computer, a data center, a workstation, a digital television, a set-top box, a navigation system, etc.

The storage device 300 according to some example embodiments is implemented or equipped with artificial intelligence (AI) function. For example, the storage device 300 may be configured to operate as a storage medium that performs data storage function, and may also be configured to operate as a computing device that execute a neural network system to perform an AI function.

For example, the storage device 300 may be configured to operate in one of a first operation mode and a second operation mode. In the first operation mode, the storage device 300 may perform the data storage function, such as a write operation for storing first input data UDAT received from the host device 200, a read operation for outputting stored data to the host device 200, or the like. In the second operation mode, the storage device 300 may perform the AI function, such as an AI calculation and/or computation (e.g., arithmetic operation for AI) based on second input data IDAT received from the host device 200 to generate calculation result data RDAT, an operation of outputting the calculation result data RDAT to the host device 200, or the like. Although FIG. 1 illustrates that only data is transmitted, a command, an address, etc. corresponding to the data may also be transmitted.

The storage controller 310 may include a first processor 312 and a second processor 314. The first processor 312 may control overall operations of the storage device 300, and may control operations associated with the data storage function in the first operation mode. The second processor 314 may control operations, executions or calculations associated with the AI function in the second operation mode. In the example of FIG. 1, the first processor 312 and the second processor 314 may be formed or implemented as one chip or may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The plurality of nonvolatile memories 320a, 320b, 320c and 320d may include (e.g., may be divided or categorized into) at least one first nonvolatile memory and at least one second nonvolatile memory. The first nonvolatile memory may be configured to be accessed by the first processor 312, and may be assigned or allocated to perform the data storage function. The second nonvolatile memory may be configured to be accessed by the second processor 314, and may be assigned or allocated to perform the AI function. For example, as will be described with reference to FIG. 4, the first nonvolatile memory may store the first input data UDAT, and the second nonvolatile memory may store weight data associated with the AI calculation.

According to some example embodiments, the first nonvolatile memory and the second nonvolatile memory may be formed or implemented as one chip, or may be formed or implemented as two separated chips. In some example embodiments, when the first nonvolatile memory is accessed only by the first processor 312 and the second nonvolatile memory is accessed only by the second processor 314, the plurality of nonvolatile memories 320a, 320b, 320c and 320d may further include a third nonvolatile memory accessed by both the first processor 312 and the second processor 314.

The AI function of the storage device 300 may be performed independently of and/or individually/separately from a control of the host device 200, may be performed by the storage device 300 internally and/or by the storage device 300 itself. For example, the neural network system executed internally by the storage device 300 may be implemented and/or driven separately from the neural network system executed by the host device 200. The storage device 300 may perform the AI function based on the neural network system executed internally by the storage device 300, regardless of the control of the host device 200. According to example embodiments, the neural network system executed internally by the storage device 300 and the neural network system executed by the host device 200 may be the same type or different types.

A conventional storage device is not implemented or equipped with an AI function, and performs the AI function using resources or accelerators included in a host device. When an AI function including a relatively small amount of calculation is to be performed, a relatively small amount of calculation should be performed using a relatively large resource included in the host device. In this case, the power consumption may increase, the data traffic between the host device and the storage device may be exceed the amount of computation, and thus a bottleneck may occur. As a result, it may be inefficient to perform the AI function on the host device when the AI function including a relatively small amount of calculation is to be performed.

The storage device 300 according to some example embodiments may be configured to be implemented with the AI function, and the storage device 300 may further include the second processor 314 that performs the AI function and the AI calculation. The second processor 314 may be separated or distinct from the first processor 312 that controls the operation of the storage device 300. The AI function of the storage device 300 may be performed independently of the control of the host device 200, and may be performed by the storage device 300 by itself. The storage device 300 may, for example, be configured to receive only the second input data IDAT, which is a target of the AI calculation, and may be configured to output only the calculation result data RDAT, which is a result of the AI calculation. Accordingly, the data traffic between the host device 200 and the storage device 300 may be reduced. In addition, the first and second processors 312 and 314 may be separated from each other, and the nonvolatile memories accessed by the first and second processors 312 and 314 may also be separated from each other, thereby reducing the power consumption.

Figure 2:
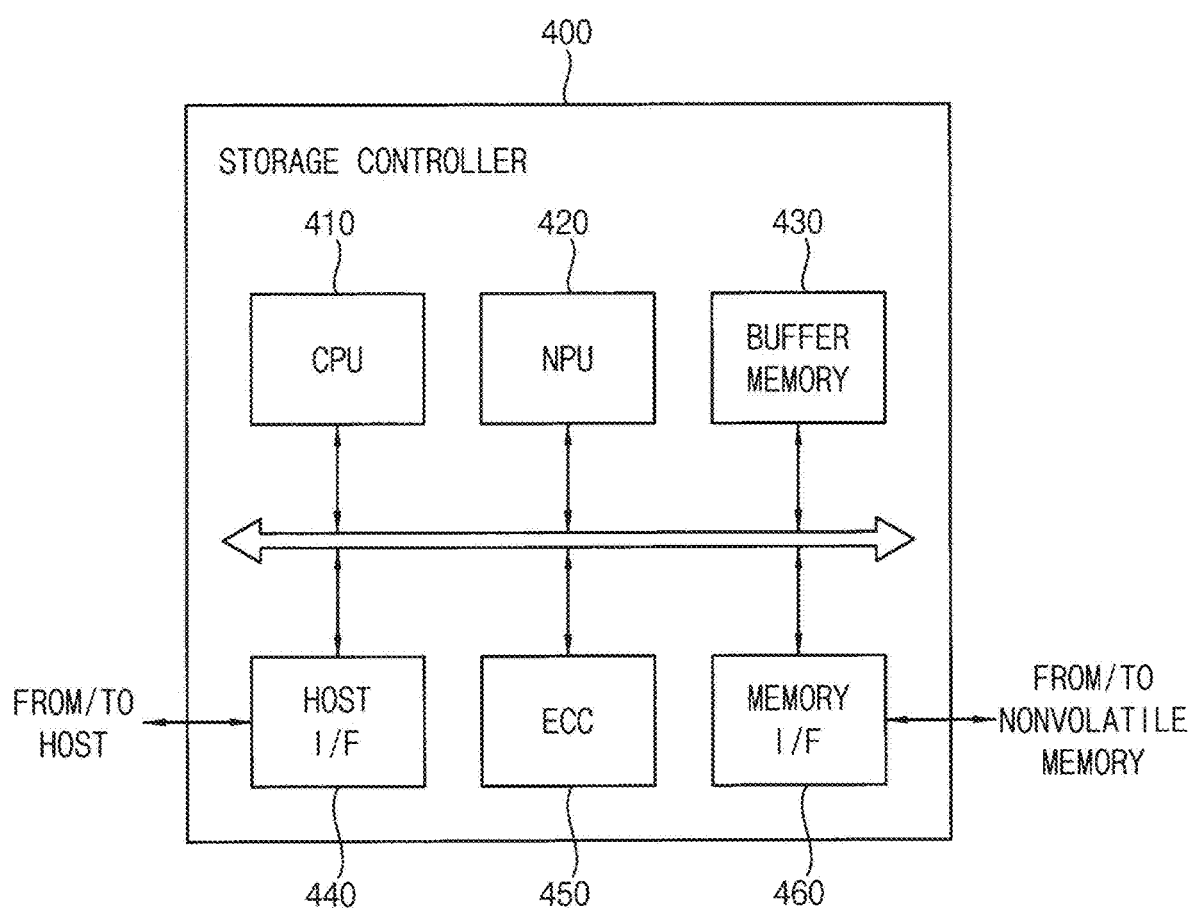
FIG. 2 is a block diagram illustrating an example of a storage controller included in a storage device according to some example embodiments.

FIG. 2 is a block diagram illustrating an example of a storage controller included in a storage device according to some example embodiments.

Referring to FIG. 2, a storage controller 400 may include a first processor 410, a second processor 420, a buffer memory 430, a host interface 440, an error correction code (ECC) block 450 and a memory interface 460.

The first processor 410 may be configured to control an operation of the storage controller 400 in response to a command received via the host interface 440 from a host device (e.g., the host device 200 in FIG. 1). In some example embodiments, the first processor 410 may control respective components by employing firmware for operating a storage device (e.g., the storage device 300 in FIG. 1).

The first processor 410 may be configured to control the operations associated with the data storage function, and the second processor 420 may control the operations associated with the AI function and the AI calculation. The first processor 410 and the second processor 420 in FIG. 2 may be the same as or similar to the first processor 312 and the second processor 314 in FIG. 1, respectively. For example, the first processor 410 may be a CPU, and the second processor 420 may be a NPU, or may comprise processing circuitry such as hardware including logic circuits; a hardware/software combination such as a processor executing software; or a combination thereof.

In some example embodiments, the second processor 420 may be an NPU, and the NPU included in the storage controller 400 may be smaller than a NPU (e.g., the NPU 240 in FIG. 1) included in the host device 200. For example, the second processor 420 may have data throughput, arithmetic capacity, power consumption, etc. less than those of the NPU 240.

The buffer memory 430 may be configured to store instructions and data executed and processed by the first processor 410 and the second processor 420. For example, the buffer memory 430 may be implemented with a volatile memory with relatively small capacity and high speed, such as a static random access memory (SRAM), a cache memory, or the like.

The ECC block 450 be configured to error correction and may be configured to perform coded modulation, for example, by using at least one of a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes and/or other error correction codes.

The host interface 440 may be configured to provide physical connections between the host device 200 and the storage device 300. For example, the host interface 440 may provide an interface corresponding to a bus format of the host for communication between the host device 200 and the storage device 300. A bus format of the host interface 440 may be the same as or similar to a bus format of the host interface 220 in FIG. 1.

The memory interface 460 may be configured to exchange data with nonvolatile memories (e.g., the nonvolatile memories 320a, 320b, 320c and 320d in FIG. 2). The memory interface 460 may be configured to transfer data to the nonvolatile memories 320a, 320b, 320c and 320d, and/or may be configured to receive data read from the nonvolatile memories 320a, 320b, 320c and 320d. In some example embodiments, the memory interface 460 may be connected to the nonvolatile memories 320a, 320b, 320c and 320d via one channel. In other example embodiments, the memory interface 460 may be connected to the nonvolatile memories 320a, 320b, 320c and 320d via two or more channels.

Figure 3:
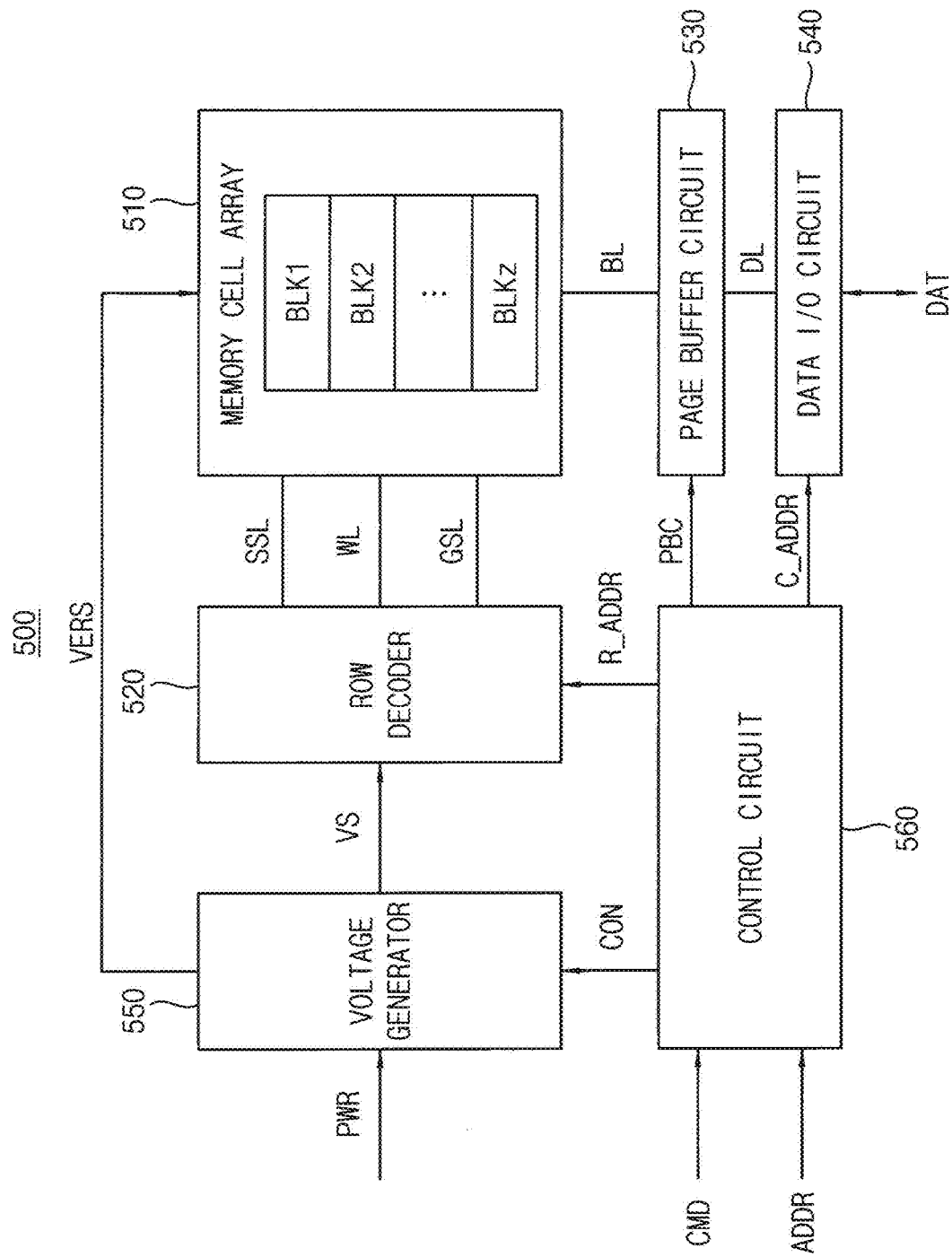
FIG. 3 is a block diagram illustrating an example of a nonvolatile memory included in a storage device according to some example embodiments.

FIG. 3 is a block diagram illustrating an example of a nonvolatile memory included in a storage device according to some example embodiments.

Referring to FIG. 3, a nonvolatile memory 500 includes a memory cell array 510, a row decoder 520, a page buffer circuit 530, a data input/output (I/O) circuit 540, a voltage generator 550, and a control circuit 560.

The memory cell array 510 may be connected to the row decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2 . . . BLKz each of which includes memory cells. In addition, each of the plurality of memory blocks BLK1, BLK2 . . . BLKz may be divided into a plurality of pages.

In some example embodiments, the plurality of memory cells may be arranged in a two dimensional (2D) array structure and/or a three dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 be configured to receive a command CMD and an address ADDR from the outside (e.g., the host device 200 and/or the storage controller 310 in FIG. 1), and may be configured to control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may be configured to generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL and the plurality of ground selection lines GSL.

For example, in the data erase/write/read operations, the row decoder 520 may determine at least one of the plurality of wordlines WL as a selected wordline, and may determine the rest and/or remainder of the plurality of wordlines WL other than the selected wordline as unselected wordlines, based on the row address R_ADDR.

In addition, in the data erase/write/read operations, the row decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the row decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may be configured to generate voltages VS for an operation of the nonvolatile memory device 500 based on a power PWR and the control signals CON. The voltages VS may be applied to the plurality of string selection lines SSL, the plurality of wordlines WL and the plurality of ground selection lines GSL via the row decoder 520. In addition, the voltage generator 550 may be configured to generate an erase voltage VERS for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recover read operation, the voltage generator 550 may apply the read voltage to a wordline adjacent to the selected wordline and may apply a recover read voltage to the selected wordline via the row decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. For example, the page buffer circuit 530 may operate as a write driver or a sensing amplifier according to an operation mode of the nonvolatile memory device 500.

The data I/O circuit 540 may be connected to the page buffer circuit 530 via data lines DL. The data I/O circuit 540 may be configured to provide the data DAT from an outside of the nonvolatile memory device 500 to the memory cell array 510 via the page buffer circuit 530 or may provide the data DAT from the memory cell array 510 to the outside of the nonvolatile memory device 500, based on the column address C_ADDR.

Figure 4:
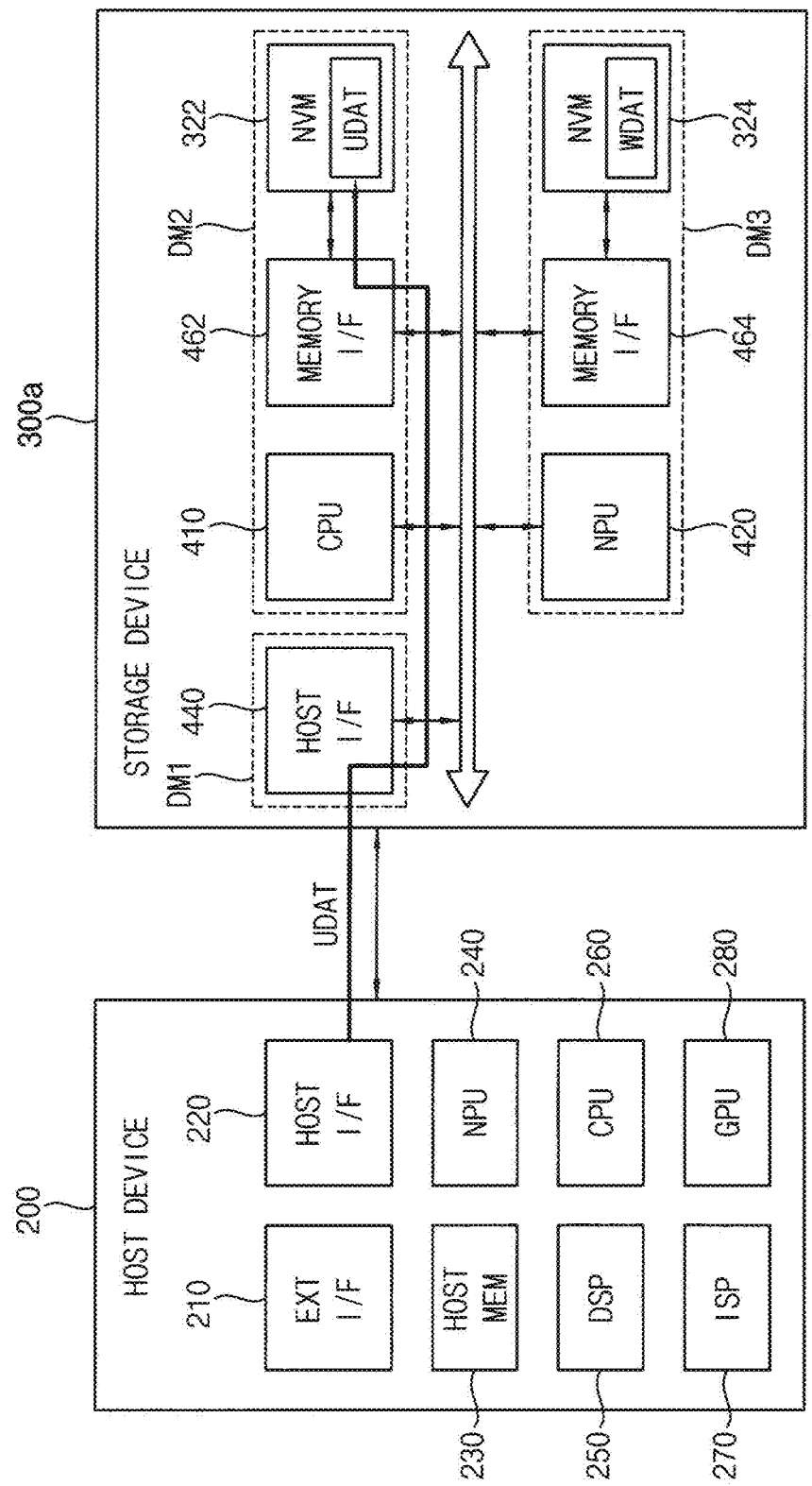
Figure 5B:
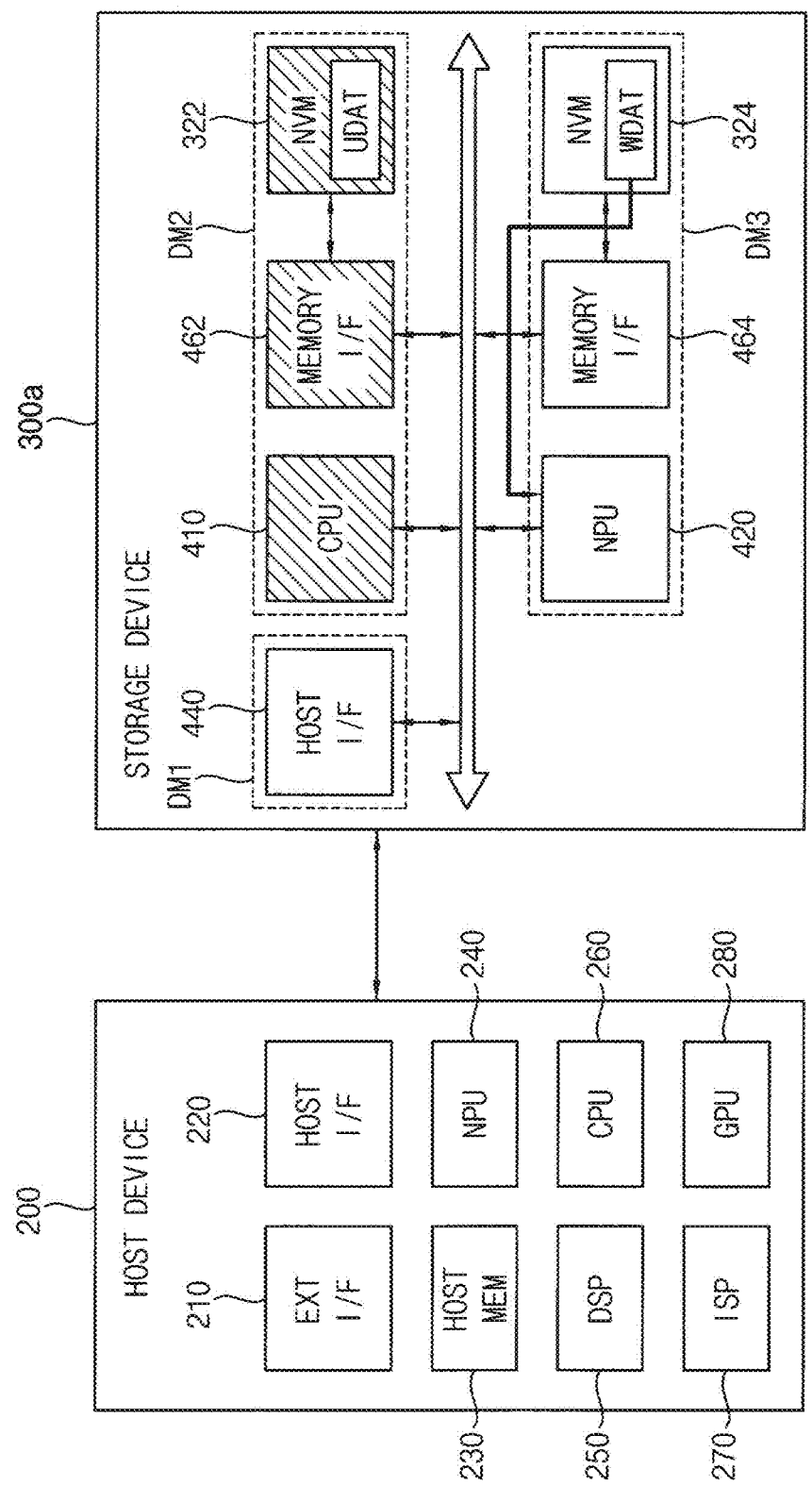
Figure 5C:
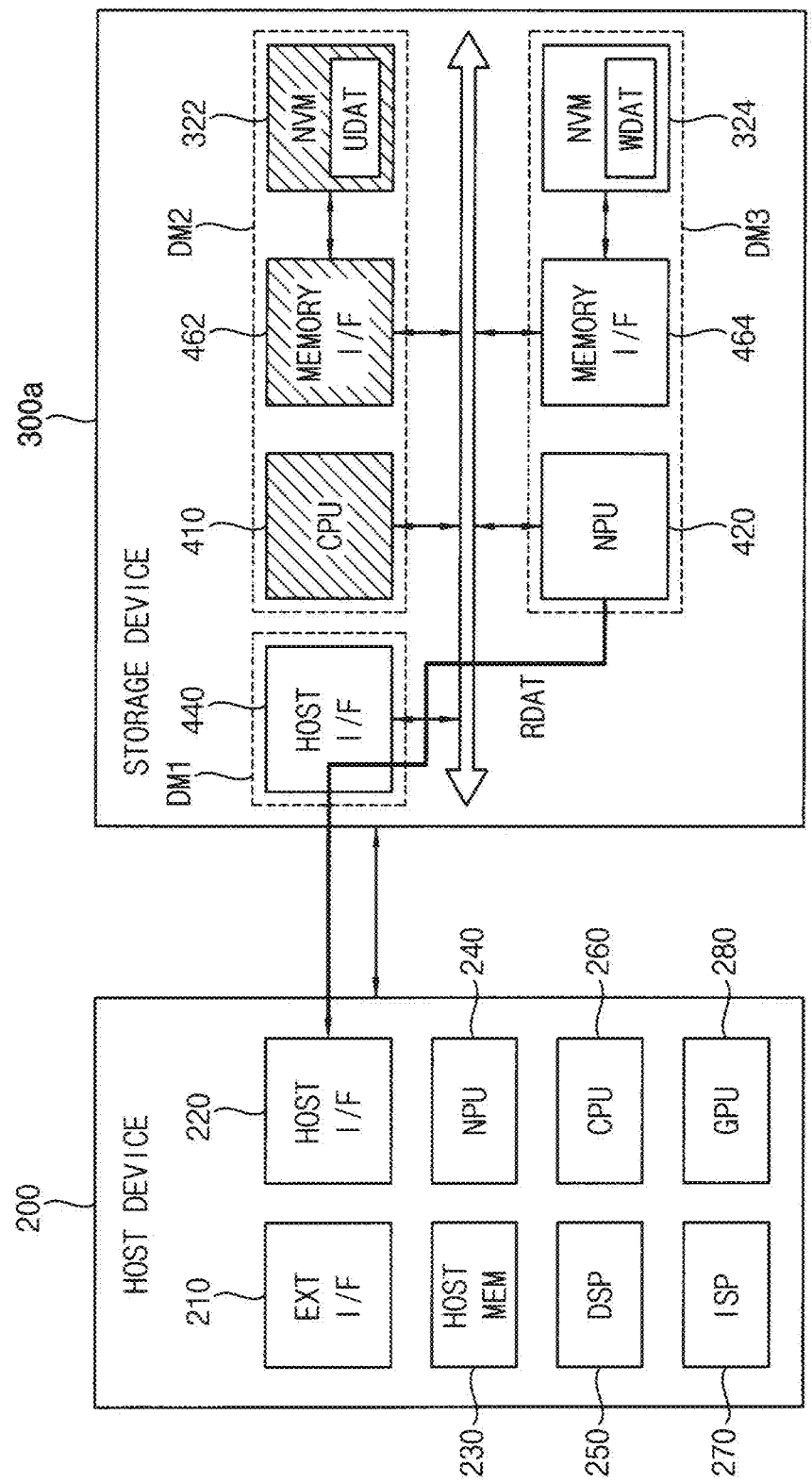

FIGS. 4, 5A, 5B and 5C are diagrams for describing an operation of the storage system of FIG. 1. FIG. 4 illustrates an operation of the storage system 100 in the first operation mode. FIGS. 5A, 5B and 5C illustrate an operation of the storage system 100 in the second operation mode. For convenience of illustration, components that are less relevant to the description of the illustrated example embodiments among all components of the storage device are omitted.

Referring to FIG. 4, a host device 200 in FIG. 4 may be the same as or similar to the host device 200 in FIG. 1. A storage device 300a in FIG. 4 may include a host interface 440, a first processor 410, a first memory interface 462, a first nonvolatile memory 322, a second processor 420, a second memory interface 464 and a second nonvolatile memory 324.

The host interface 440, the first processor 410 and the second processor 420 in FIG. 4 may be the same as or similar to the host interface 440, the first processor 410 and the second processor 420 in FIG. 2, respectively. The first and second memory interfaces 462 and 464 may be included in the memory interface 460 in FIG. 2. The first and second nonvolatile memories 322 and 324 may be included in the plurality of nonvolatile memories 320a, 320b, 320c and 320d in FIG. 1. The host interface 440 may be included in a first clock/power domain DM1. The first processor 410, the first memory interface 462 and the first nonvolatile memory 322 may be included in a second clock/power domain DM2 that is different and distinguished from the first clock/power domain DM1. The second processor 420, the second memory interface 464 and the second nonvolatile memory 324 may be included in a third clock/power domain DM3 that is different and distinguished from the first and second clock/power domains DM1 and DM2.

In the first operation mode, first input data UDAT may be provided from the host interface 220 of the host device 200, and the storage device 300a may receive the first input data UDAT. For example, the first input data UDAT may be any user data processed by at least one of the NPU 240, the DSP 250, the CPU 260, the ISP 270 and the GPU 280.

The storage device 300a may perform the data storage function for the first input data UDAT. For example, the first input data UDAT may be transmitted and stored in the first nonvolatile memory 322 through the host interface 440 and the first memory interface 462. Although the data storage function is described based on a write operation, example embodiments are not limited thereto, and a read operation may be performed to provide data UDAT stored in the first nonvolatile memory 322 to the host device 200.

In the first operation mode illustrated in FIG. 4, the host interface 440, the first and second processors 410 and 420, the first and second memory interfaces 462 and 464 and the first and second nonvolatile memories 322 and 324 may be all enabled or activated. However, example embodiments are not limited thereto, and the second processor 420, the second memory interface 464 and the second nonvolatile memory 324 may have an idle state in the first operation mode, as will be described with reference to FIG. 7.

Referring to FIG. 5A, in the second operation mode, second input data IDAT may be provided from the external interface 210 and the host interface 220 of the host device 200, and the storage device 300a may receive the second input data IDAT. For example, the second input data IDAT may be any inference data that is a target of the AI calculation. For example, when the AI function is voice recognition, the second input data IDAT may be voice data received from a microphone included in the external interface 210. For another example, when the AI function is image recognition, the second input data IDAT may be image data received from a camera included in the external interface 210. The second input data IDAT may be transmitted to the second processor 420 through the host interface 440.

In the second operation mode, the host interface 440, the second processor 420, the second memory interface 464 and the second nonvolatile memory 324 may be enabled or may have an activation state, and the first processor 410, the first memory interface 462 and the first nonvolatile memory 322 may be switched or changed from the activation state to an idle state (e.g. a sleep, power saving, or power down state). In FIG. 5A and following figures, components having the idle state are illustrated with a hatched pattern. Only the first processor 410, the first memory interface 462 and the first nonvolatile memory 322 may be included in the separated clock/power domain DM2 such that only the first processor 410, the first memory interface 462 and the first nonvolatile memory 322 are switched to the idle state, and thus the power consumption may be reduced in the second operation mode.

Referring to FIG. 5B, in the second operation mode, the second processor 420 may load weight data WDAT stored in the second nonvolatile memory 324. The weight data WDAT may be transmitted to the second processor 420 through the second memory interface 464. For example, the weight data WDAT may represent a plurality of weight parameters that are pre-training parameters and are included in a plurality of layers of a neural network system. The weight data WDAT may be pre-trained to be suitable or appropriate for the neural network system, and may be stored in the second nonvolatile memory 324 in advance.

In some example embodiments, the weight data WDAT may be continuously, consecutively and/or sequentially stored in the second nonvolatile memory 324. In this example, the second processor 420 may directly load the weight data WDAT using only a start position (e.g., a start address) in which the weight data WDAT is stored and a size of the weight data WDAT, without a flash translation layer (FTL) operation.

In some example embodiments, the neural network system includes at least one of various neural network systems and/or machine learning systems, e.g., an artificial neural network (ANN) system, a convolutional neural network (CNN) system, a deep neural network (DNN) system, a deep learning system, or the like. Such machine learning systems may include a variety of learning models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide for example, at least one of various services and/or applications, e.g., an image classify service, a user authentication service based on bio-information or biometric data, an advanced driver assistance system (ADAS) service, a voice assistant service, an automatic speech recognition (ASR) service, or the like, and may be performed, executed, or processed by the host device 200 and/or the storage device 300a. A configuration of the neural network system will be described with reference to FIGS. 6A, 6B, and 6C.

Referring to FIG. 5C, in the second operation mode, the second processor 420 may perform the AI calculation based on the second input data IDAT received in FIG. 5A and the weight data WDAT loaded in FIG. 5B to generate calculation result data RDAT, and may transmit the calculation result data RDAT to the host device 200. The calculation result data RDAT may be transmitted to the host device 200 through the host interface 440. For example, the calculation result data RDAT may represent a result of multiplication and accumulation (MAC) operations performed by the neural network system.

As described with reference to FIGS. 5A, 5B and 5C, the second processor 420 may be configured to individually and/or independently perform the AI function in the storage device 300a, and the weight data WDAT may be used only inside the storage device 300a and may not be transmitted to the host device 200. For example, the storage device 300a may exchange only the second input data IDAT and the calculation result data RDAT, which are the target and result of the AI calculation, with the host device 200. Typically, a size of the weight data WDAT may be much larger than a size of the second input data IDAT and a size of the calculation result data RDAT. Accordingly, as the AI function is implemented in the storage device 300a, the data traffic between the host device 200 and the storage device 300a may be reduced, and the computation amount of the host device 200 and the usage of the host memory 230 may also be reduced.

Figure 6B:
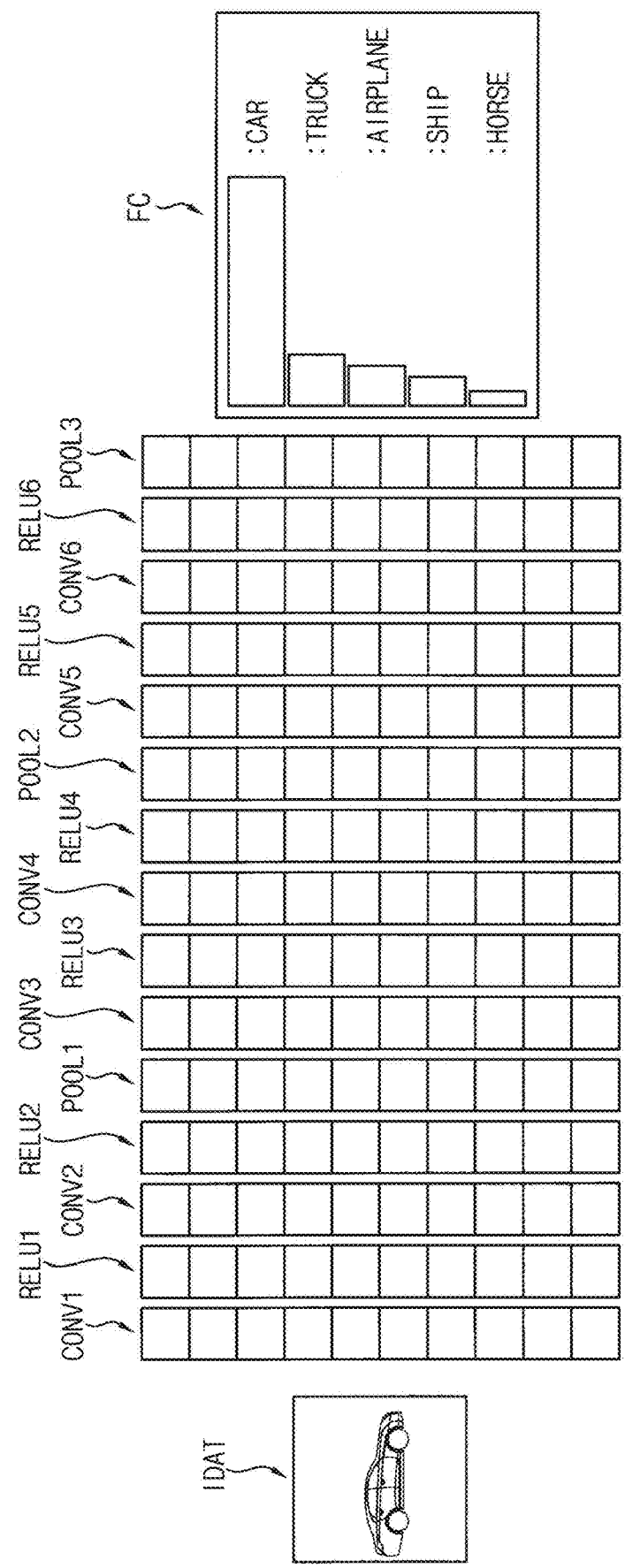
Figure 6C:
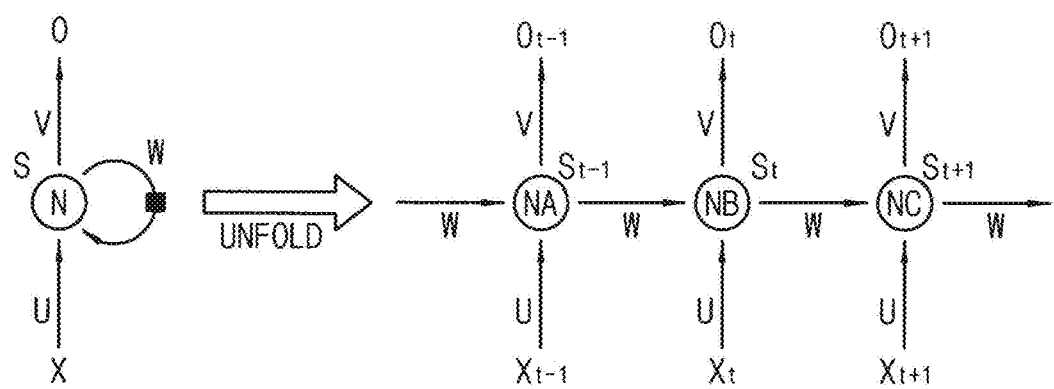

FIGS. 6A, 6B and 6C are diagrams for describing examples of a network structure that is driven by an AI function implemented in a storage device according to some example embodiments.

Referring to FIG. 6A, a general neural network (e.g., an ANN) may include an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) IDAT whose length is i may be input to the input nodes $x_1$, $x_2$, . . . , $x_i$ such that each element of the input data IDAT is input to a respective one of the input nodes $x_1$, $x_2$, . . . , $x_i$.

The plurality of hidden layers HL1, HL2, . . . , HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h^n_1$, $h^n_2$, $h^n_3$, . . . , $h^n_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h^n_1$, $h^n_2$, $h^n_3$, . . . , $h^n_m$, where m is a natural number.

The output layer OL may include j output nodes $y_1$, $y_2$, . . . , $y_j$, where j is a natural number. Each of the output nodes $y_1$, $y_2$, . . . , $y_j$ may correspond to a respective one of classes to be categorized. The output layer OL may output output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 6A may be represented by information on branches (or connections) between nodes illustrated as lines, and a weighted value assigned to each branch, which is not illustrated. Nodes within one layer may not be directly connected to one another, but nodes of different layers may be fully or partially connected to one another.

Each node (e.g., the node $h^1_1$) may be configured to receive an output of a previous node (e.g., the node $x_1$), to perform a computing operation, computation and/or calculation on the received output, and to output a result of the computing operation, computation and/or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 6A may not be suitable for handling input image data (or input sound data) because each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a CNN, which is implemented by combining the filtering technique with the general neural network, has been researched such that two-dimensional image (e.g., the input image data) is efficiently trained by the CNN.

Referring to FIG. 6B, a CNN may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the CNN may have three dimensions of width, height and depth, and thus data that is input to each layer may be volume data having three dimensions of width, height and depth. For example, if an input image in FIG. 6B has a size of 32 widths (e.g., 32 pixels) and 32 heights and three color channels R, G and B, input data IDAT corresponding to the input image may have a size of 32*32*3. The input data IDAT in FIG. 6B may be referred to as input volume data or input activation volume.

Each of the convolutional layers CONV1, CONV2, CONV3, CONV4, CONV5 and CONV6 may be configured to perform a convolutional operation on input volume data. For example, in an image processing, the convolutional operation represents an operation in which image data is processed based on a mask with weighted values and an output value is obtained by multiplying input values by the weighted values and adding up the total multiplied values. The mask may be referred to as a filter, window or kernel.

Parameters of each convolutional layer may consist of a set of learnable filters. Every filter may be small spatially (along width and height), but may extend through the full depth of an input volume. For example, during the forward pass, each filter may be slid (e.g. convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of the RELU layers RELU1, RELU2, RELU3, RELU4, RELU5 and RELU6 may be configured to perform a rectified linear unit (RELU) operation that corresponds to an activation function defined by, e.g., a function f(x)=max (0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOL3 may be configured to perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the CNN, pairs of the CONV/RELU layers may be repeatedly arranged in the CNN, and the pooling layer may be periodically inserted in the CNN, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into a one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

The types and number of layers included in the CNN may not be limited to an example described with reference to FIG. 6B and may be changed according to the example embodiments. In addition, although not illustrated in FIG. 6B, the CNN may further include other layers such as a softmax layer for converting score values corresponding to predicted results into probability values, a bias adding layer for adding at least one bias, or the like.

Referring to FIG. 6C, a RNN may include a repeating structure using a specific node or cell N illustrated on the left side of FIG. 6C.

A structure illustrated on the right side of FIG. 6C may represent that a recurrent connection of the RNN illustrated on the left side is unfolded (or unrolled). The term "unfolded" means that the network is written out or illustrated for the complete or entire sequence including all nodes NA, NB and NC. For example, if the sequence of interest is a sentence of 3 words, the RNN may be unfolded into a 3-layer neural network, one layer for each word (e.g., without recurrent connections or without cycles).

In the RNN in FIG. 6C, X represents an input of the RNN. For example, $X_t$ may be an input at time step t, and $X_{t-1}$ and $X_{t+1}$ may be inputs at time steps t−1 and t+1, respectively.

In the RNN in FIG. 6C, S represents a hidden state. For example, $S_t$ may be a hidden state at the time step t, and $S_{t-1}$ and $S_{t+1}$ may be hidden states at the time steps t−1 and t+1, respectively. The hidden state may be calculated based on a previous hidden state and an input at a current step. For example, $S_t=f(UX_t+WS_{t-1})$. For example, the function f may be usually a nonlinearity function such as tan h or RELU. $S_{-1}$, which is required to calculate a first hidden state, may be typically initialized to all zeroes.

In the RNN in FIG. 6C, O represents an output of the RNN. For example, $O_t$ may be an output at the time step t, and $O_{t-1}$ and $O_{t+1}$ may be outputs at the time steps t−1 and t+1, respectively. For example, if it is required to predict a next word in a sentence, it would be a vector of probabilities across a vocabulary. For example, $O_t=\text{softmax}(VS_t)$.

In the RNN in FIG. 6C, the hidden state may be a "memory" of the network. For example, the RNN may have a "memory" which captures information about what has been calculated so far. The hidden state $S_t$ may capture information about what happened in all the previous time steps. The output $O_t$ may be calculated solely based on the memory at the current time step t. In addition, unlike a traditional neural network, which uses different parameters at each layer, the RNN may share the same parameters (e.g., U, V and W in FIG. 6C) across all time steps. This may represent the fact that the same task may be performed at each step, just with different inputs. This may greatly reduce the total number of parameters required to be trained or learned.

In some example embodiments, at least one of various services and/or applications (e.g., an image classify service, a user authentication service based on bio-information or biometric data, an advanced driver assistance system (ADAS) service, a voice assistant service, an automatic speech recognition (ASR) service, or the like) may be performed, executed or processed by the neural network system described with reference to FIGS. 6A, 6B and 6C.

Figure 7:
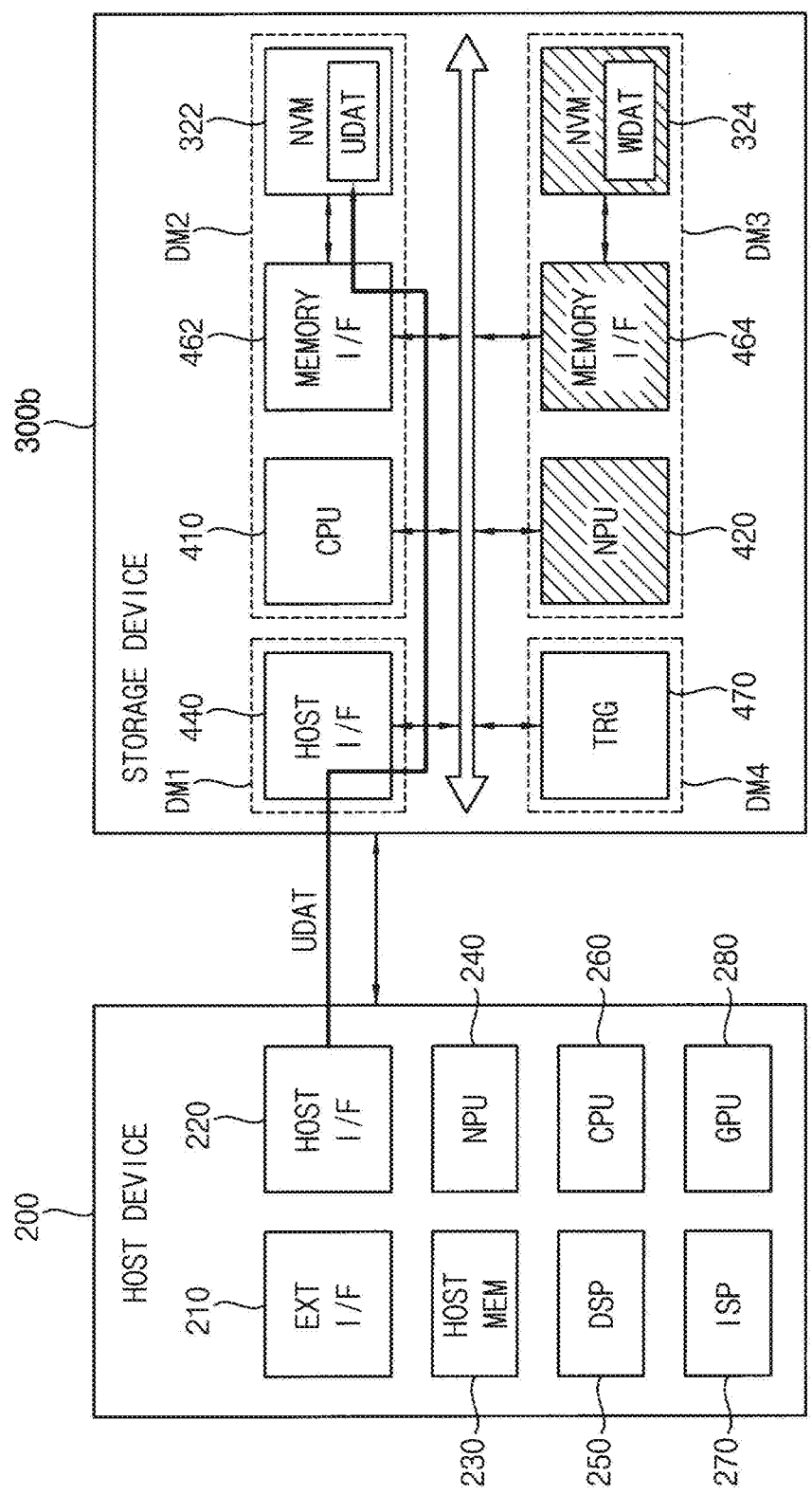
FIGS. 7, 8A and 8B are diagrams for describing an operation of the storage system of FIG. 1.
Figure 8A:
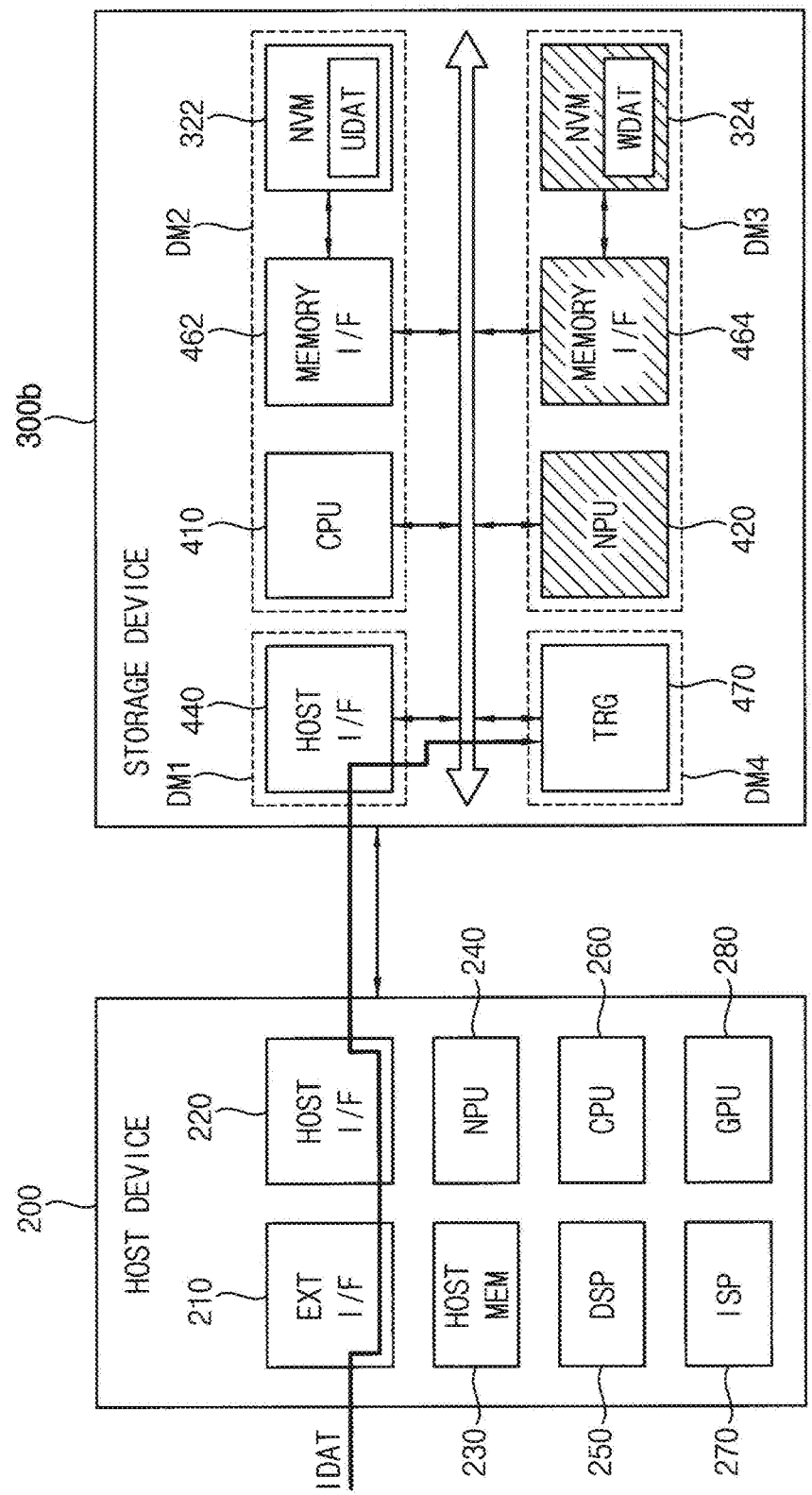
Figure 8B:
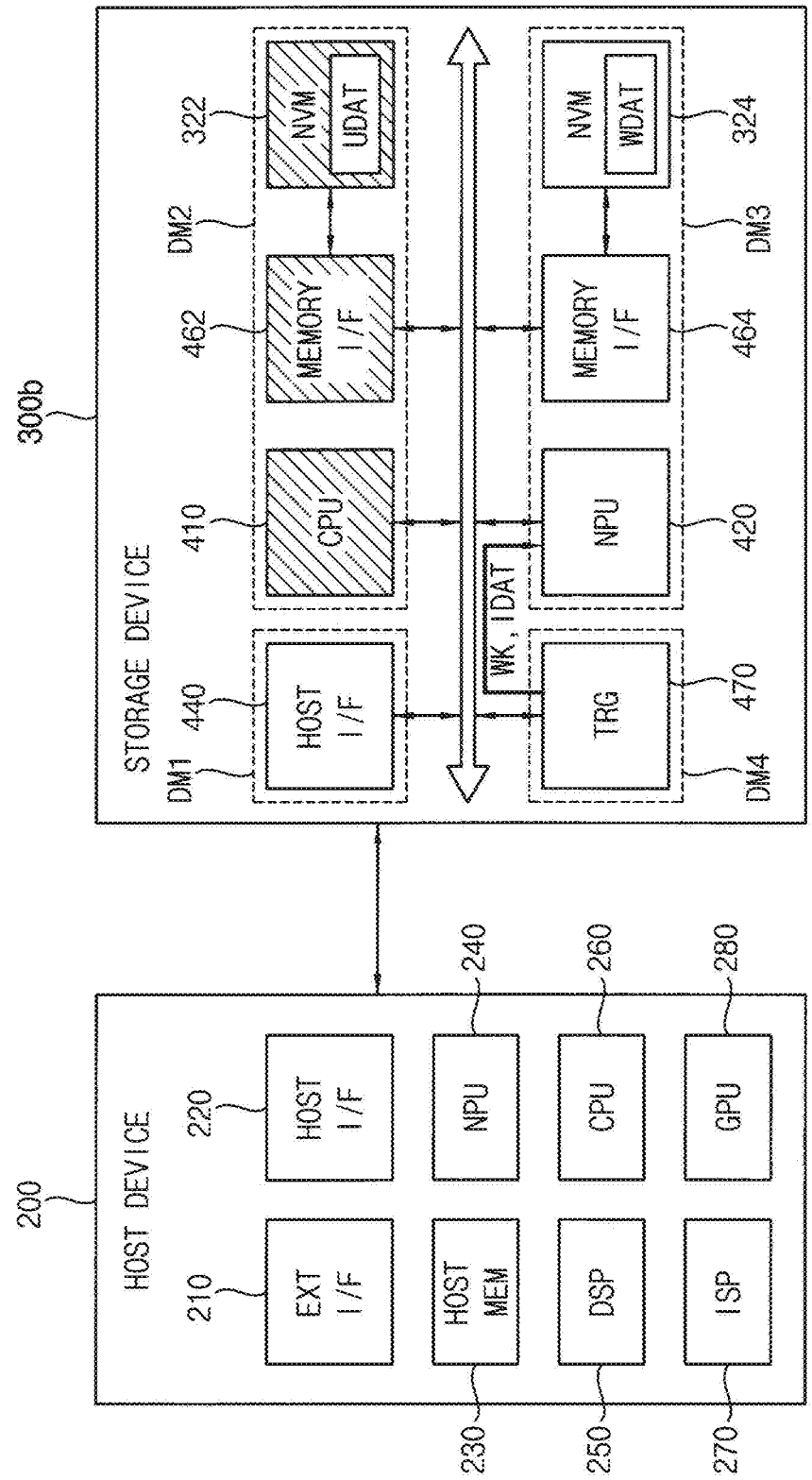

FIGS. 7, 8A and 8B are diagrams for describing an operation of the storage system of FIG. 1. The descriptions repeated with FIGS. 4, 5A, 5B and 5C will be omitted.

Referring to FIG. 7, a host device 200 in FIG. 7 may be substantially the same as or similar to the host device 200 in FIG. 1. A storage device 300b in FIG. 7 may be substantially the same as or similar to the storage device 300a in FIG. 4, except that the storage device 300b further includes a triggering unit (TRG) 470.

The triggering unit 470 may be configured to enable and/or activate the second processor 420, the second memory interface 464, and/or the second nonvolatile memory 324 when an operation mode of the storage device 300b is changed from the first operation mode to the second operation mode. The triggering unit 470 may be included in a fourth clock/power domain DM4 that is different and distinguished from the first, second and third clock/power domains DM1, DM2 and DM3. According to some example embodiments, the triggering unit 470 and the second processor 420 may be formed or implemented as one chip or two separated chips.

In the first operation mode, the first input data UDAT may be provided from the host interface 220 of the host device 200, and the storage device 300b may be configured to receive the first input data UDAT. The storage device 300b may be configured to perform the data storage function for the first input data UDAT.

In the first operation mode illustrated in FIG. 7, the host interface 440, the first processor 410, the first memory interface 462, the first nonvolatile memory 322 and the triggering unit 470 may have the activation state, and the second processor 420, the second memory interface 464 and the second nonvolatile memory 324 may have the idle state. Only the second processor 420, the second memory interface 464 and the second nonvolatile memory 324 may be included in the separated clock/power domain DM3 such that only the second processor 420, the second memory interface 464 and the second nonvolatile memory 324 have the idle state, and thus the power consumption may be reduced in the first operation mode.

Referring to FIG. 8A, in the second operation mode, the second input data IDAT may be provided from the external interface 210 and the host interface 220 of the host device 200, and the storage device 300b may be configured to receive the second input data IDAT. The second input data IDAT may be transmitted to the triggering unit 470 through the host interface 440.

Referring to FIG. 8B, the triggering unit 470 may generate a wake-up signal WK for enabling the second processor 420, the second memory interface 464 and the second nonvolatile memory 324 to transmit the wake-up signal WK to the second processor 420, and may transmit the second input data IDAT to the second processor 420 after the second processor 420, the second memory interface 464 and the second nonvolatile memory 324 are enabled.

In the second operation mode, the host interface 440 and the triggering unit 470 may have the activation state, and the second processor 420, the second memory interface 464 and the second nonvolatile memory 324 may be switched from the idle state to the activation state. Also, similar to that described with reference to FIG. 5A, the first processor 410, the first memory interface 462 and the first nonvolatile memory 322 may be switched from the activation state to the idle state.

The operations of loading the weight data WDAT and generating/transmitting the calculation result data RDAT after the operation of FIG. 8B may be similar to those described with reference to FIGS. 5B and 5C.

Figure 9:
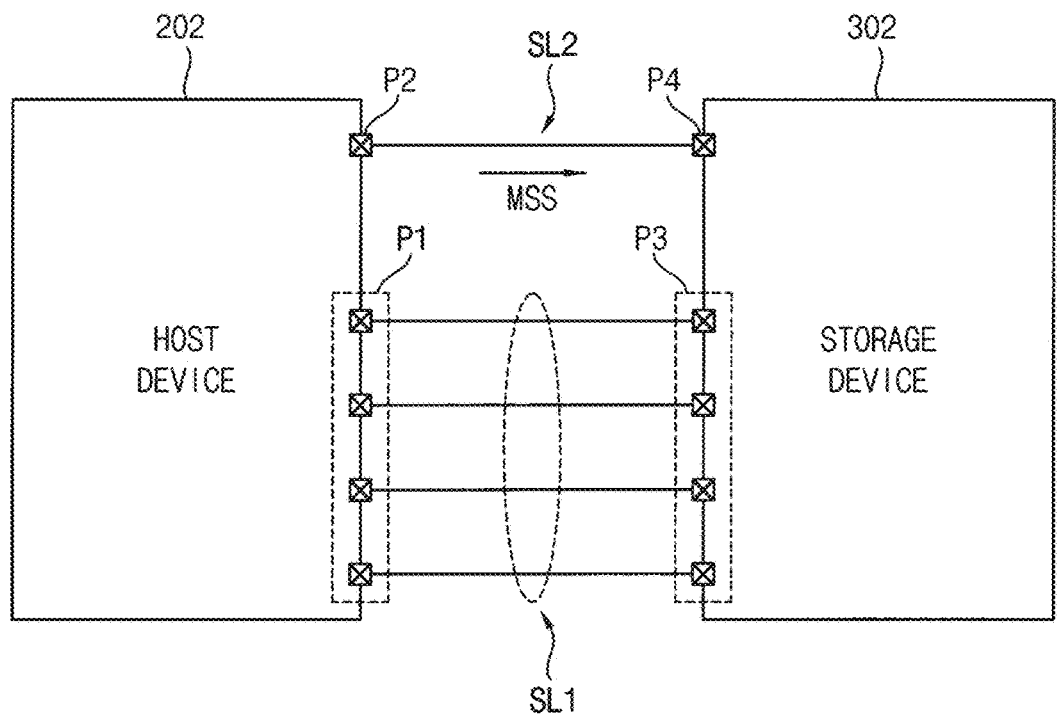
FIGS. 9 and 10 are diagrams for describing an operation of switching an operation mode in a storage system according to some example embodiments.
Figure 10:
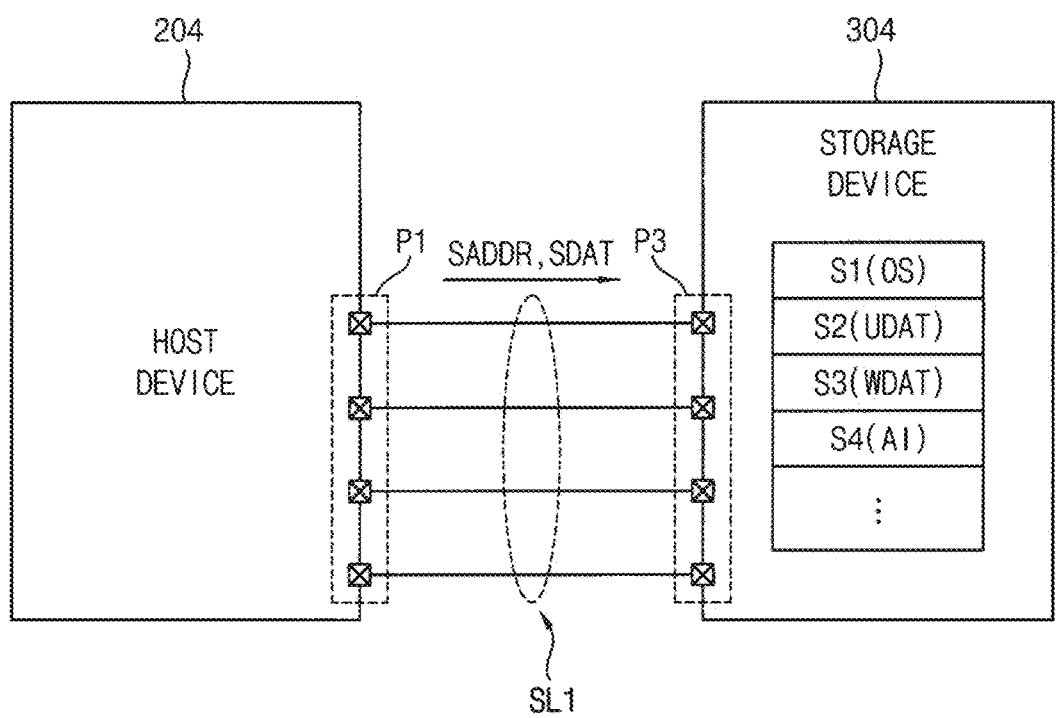

FIGS. 9 and 10 are diagrams for describing an operation of switching an operation mode in a storage system according to example embodiments.

Referring to FIG. 9, an operation mode of a storage device 302 may be switched or a specific operation mode of the storage device 302 may be enabled or activated based on a mode setting signal MSS that is provided from a host device 202 to the storage device 302.

For example, the host device 202 may include a plurality of first pins P1 and a second pin P2 distinguished from the plurality of first pins P1, and the storage device 302 may include a plurality of third pins P3 and a fourth pin P4 distinguished from the plurality of third pins P3. A plurality of first signal lines SL1 for connecting the plurality of first pins P1 with the plurality of third pins P3 may be formed between the plurality of first pins P1 and the plurality of third pins P3, and a second signal line SL2 for connecting the second pin P2 with the fourth pin P4 may be formed between the second pin P2 and the fourth pin P4. For example, a pin may be a contact pad or a contact pin, but example embodiments are not limited thereto.

The plurality of first pins P1, the plurality of third pins P3 and the plurality of first signal lines SL1 may form a general interface between the host device 202 and the storage device 302, and may be configured to exchange the first input data UDAT, the second input data IDAT and the calculation result data RDAT illustrated in FIG. 1.

The second pin P2, the fourth pin P4 and the second signal line SL2 may be formed separately and additionally from the general interface between the host device 202 and the storage device 302, and may be physically added for the mode setting signal MSS. For example, the mode setting signal MSS may be transmitted through the second and fourth pins P2 and P4, and the second and fourth pins P2 and P4 may be used only to transmit the mode setting signal MSS. For example, each of the second and fourth pins P2 and P4 may be a general purpose input/output (GPIO) pin.

Referring to FIG. 10, a specific storage space S4 of a storage device 304 may be assigned or allocated to a special function register (SFR) area for enabling or activating the AI function, and an operation mode of the storage device 304 may be switched or a specific operation mode of the storage device 304 may be enabled or activated based on an address SADDR and setting data SDAT that are provided from a host device 204 to the storage device 304.

For example, the host device 204 may include a plurality of first pins P1, the storage device 304 may include a plurality of third pins P3, and a plurality of first signal lines SL1 may be formed between the plurality of first pins P1 and the plurality of third pins P3. The plurality of first pins P1, the plurality of third pins P3 and the plurality of first signal lines SL1 in FIG. 10 may be the same as or similar to the plurality of first pins P1, the plurality of third pins P3 and the plurality of first signal lines SL1 in FIG. 9, respectively.

Storage spaces of the storage device 304 may include or may be divided into a first storage space 51 for an OS, a second storage space S2 for user data, a third storage space S3 for weight data, a fourth storage space S4 for the AI function, etc. When the address SADDR for the fourth storage space S4 and the setting data SDAT for enabling or disabling the AI function are provided to the storage device 304, the second operation mode may be enabled or disabled.

For example, when changing or switching the operation mode of the storage device according to example embodiments, the pins P2 and P4 for the mode setting signal MSS may be physically added to the general interface as illustrated in FIG. 9, or the specific address and storage space may be assigned and used for switching the operation mode while using the general interface as it is as illustrated in FIG. 10.

Although not illustrated in FIGS. 9 and 10, an unused command field among command fields used in the storage device may be assigned and used for switching the operation mode.

Figure 11A:
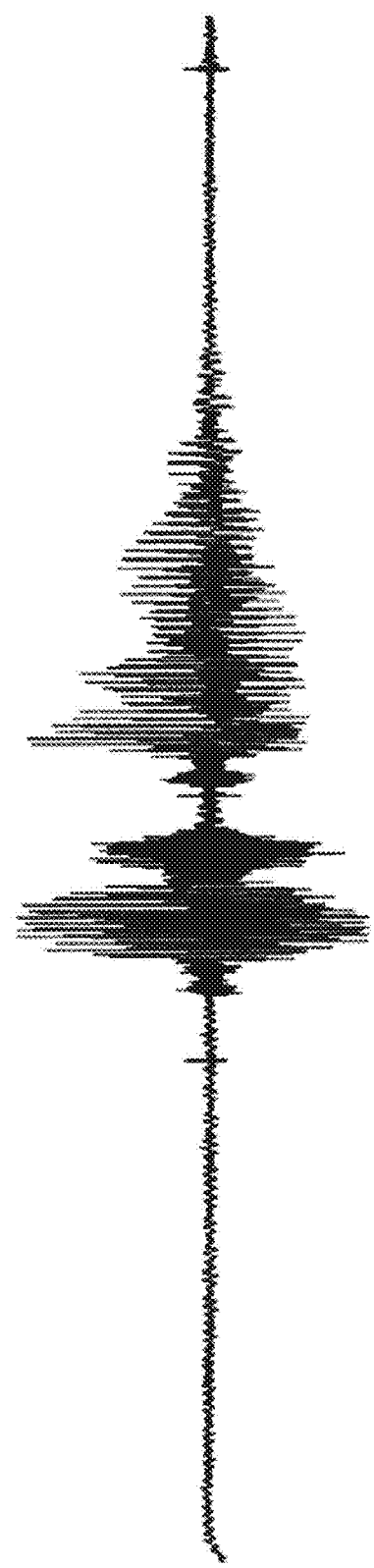
FIGS. 11A, 11B and 11C are diagrams for describing an operation of transmitting data in a storage system according to some example embodiments.
Figure 11B:
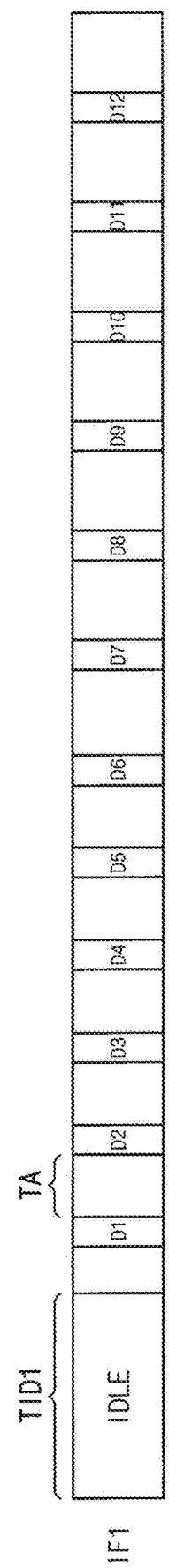
Figure 11C:
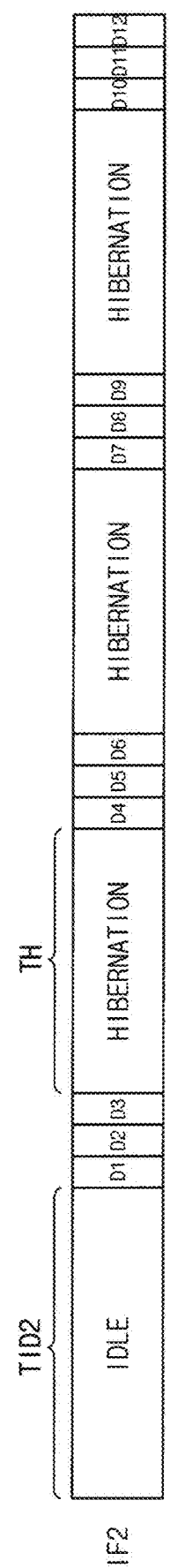

FIGS. 11A, 11B and 11C are diagrams for describing an operation of transmitting data in a storage system according to some example embodiments.

Referring to FIG. 11A, an example of executing a voice recognition service based on a neural network service, e.g., an example in which the second input data IDAT is voice data VDAT received from a microphone included in the external interface 210 is illustrated.

Referring to FIG. 11B, an interface IF1 between the host device 200 and the storage device 300 is illustrated when the voice data VDAT is sampled and transmitted in real time. An idle interval TID1 exists initially, and then sampled data D1, D2, D3, D4, D5, D6, D7, D8, D9, D10, D11 and D12 are sequentially transmitted. In this case, the sampled data D1 to D12 having a relatively small size are transmitted with a relatively slow rate such as about 24 kHz, a time interval TA in which data is not transmitted is shorter than a reference time, and thus an interface (e.g., the host interfaces 220 and 440) between the host device 200 and the storage device 300 may not enter a hibernation state during the time interval TA.

Referring to FIG. 11C, an interface IF2 between the host device 200 and the storage device 300 is illustrated when the voice data VDAT is sampled and the sampled data D1 to D12 are collected and transmitted in a predetermined number. An idle interval TID2 may exist initially, and then three sampled data among the sampled data D1 to D12 may be collected and transmitted at once. As compared to the operation of FIG. 11B, a time interval TH in which data is not transmitted may be longer than the reference time, and thus the interface (e.g., the host interfaces 220 and 440) between the host device 200 and the storage device 300 may enter the hibernation state during the time interval TH.

Figure 12:
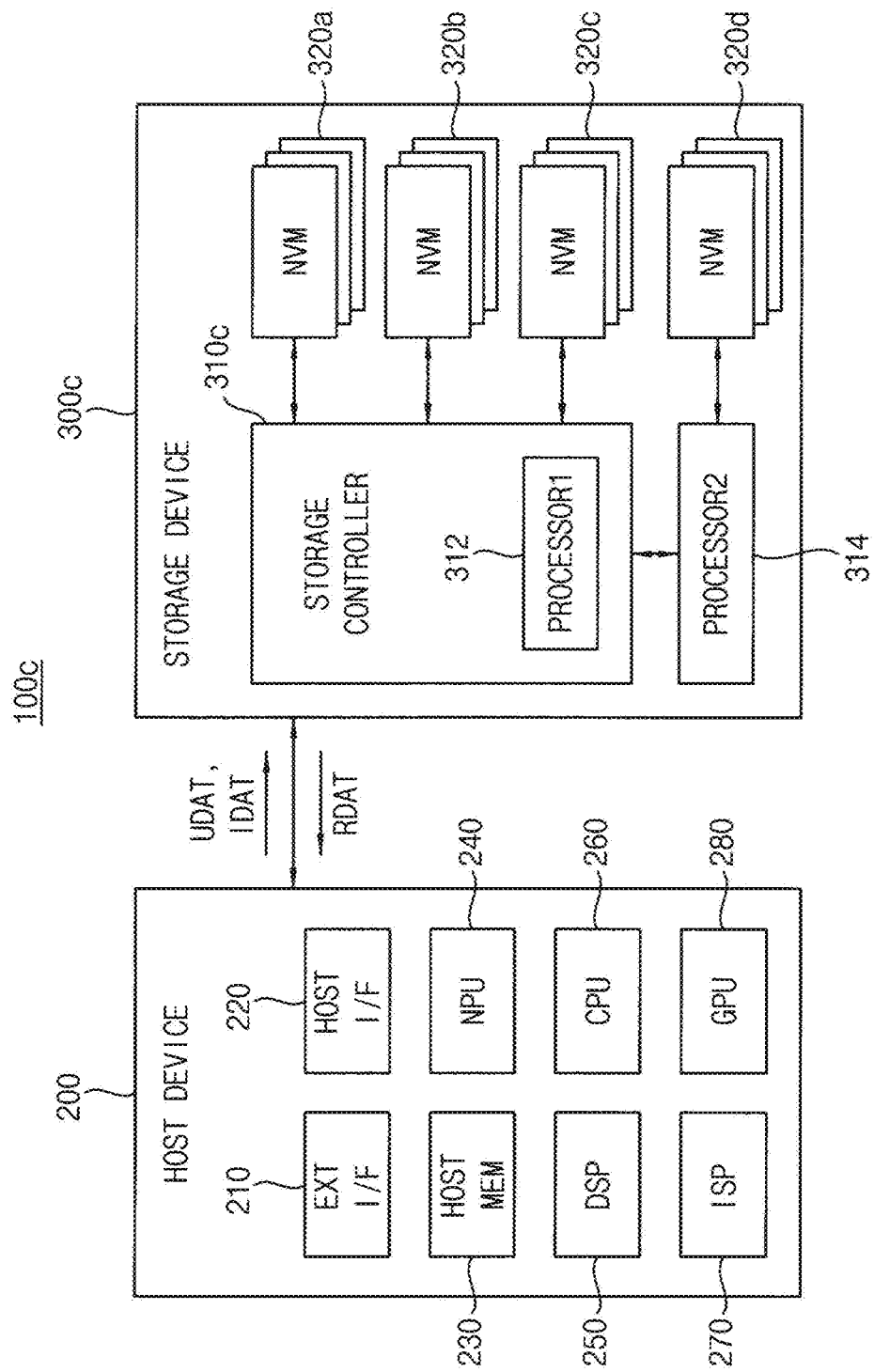
FIG. 12 is a block diagram illustrating a storage device and a storage system including the storage device according to some example embodiments.

FIG. 12 is a block diagram illustrating a storage device and a storage system including the storage device according to example embodiments. The descriptions repeated with FIG. 1 will be omitted.

Referring to FIG. 12, a storage system 100c includes a host device 200 and a storage device 300c.

The storage system 100c of FIG. 12 may be the same as or similar to the storage system 100 of FIG. 1, except that a configuration of a storage controller 310c included in the storage device 300c is changed.

The storage controller 310c includes a first processor 312. A second processor 314 is located or disposed outside the storage controller 310c. In the example of FIG. 12, the first processor 312 and the second processor 314 may be formed or implemented as two separated chips.

In some example embodiments, when the storage system 100c further includes a triggering unit (e.g., the triggering unit 470 in FIG. 7), the triggering unit 470 and the second processor 420 may be formed or implemented as one chip or two separated chips.

Figure 13:
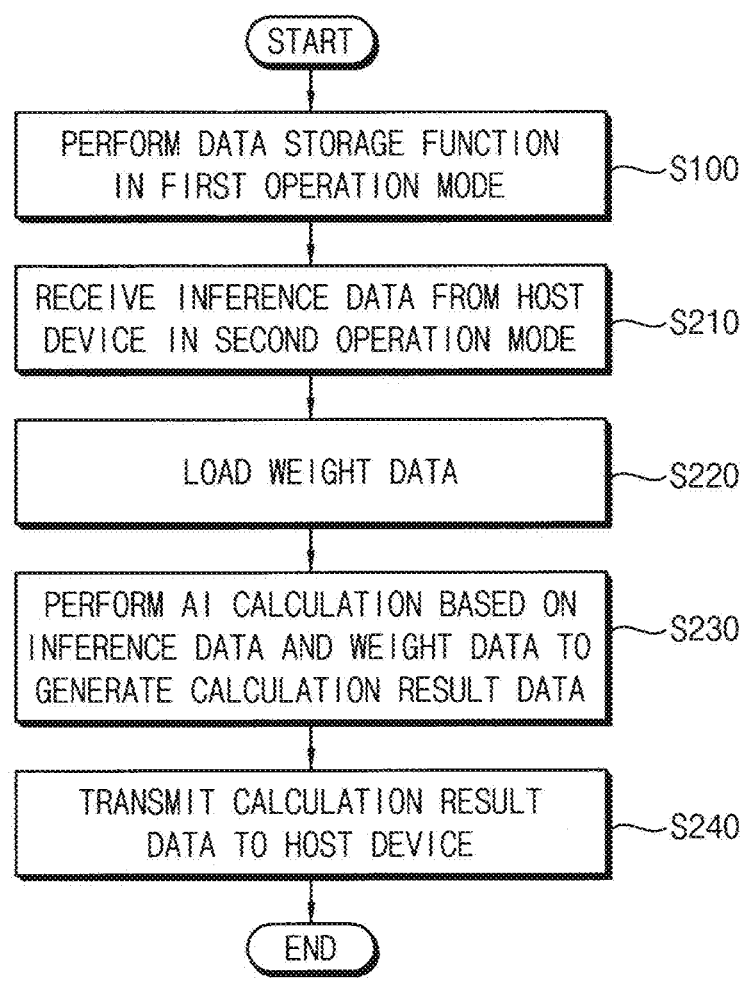
FIG. 13 is a flowchart illustrating a method of operating a storage device according to some example embodiments.

FIG. 13 is a flowchart illustrating a method of operating a storage device according to some example embodiments.

Referring to FIGS. 1 and 13, in a method of operating a storage device according to some example embodiments, the storage device 300 is configured to perform the data storage function in the first operation mode (step S100). For example, the first processor 312 may store user data in the first nonvolatile memory 322 or may read user data stored in the first nonvolatile memory 322.

The storage device 300 performs the AI function in the second operation mode. For example, the second processor 314 may receive inference data from the host device 200 (step S210), may load weight data from the second nonvolatile memory 324 (step S220), may perform the AI calculation based on the inference data and the weight data to generate calculation result data (step S230), and may transmit the calculation result data to the host device 200 (step S240).

In some example embodiments, the host device 200 and the storage device 300 may respectively execute or drive the neural network system and may integrate execution results in the storage system 100 according to example embodiments. For example, the storage system 100 may be used to simultaneously drive and compute two or more neural network systems to perform a complex inference operation. For example, when performing voice or speech recognition, the host device 200 may drive the CNN to recognize the lip movement, and the storage device 300 may drive the RNN to recognize the voice or speech itself, and then these recognition results may be integrated to improve recognition accuracy.

Figure 14:
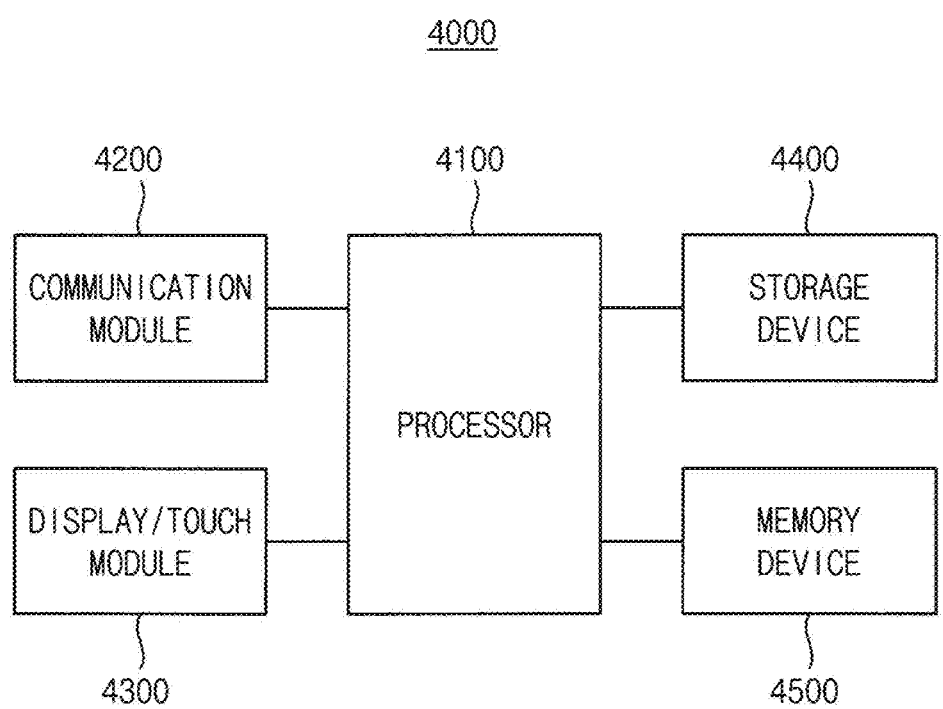
FIG. 14 is a block diagram illustrating an electronic system according to some example embodiments.

FIG. 14 is a block diagram illustrating an electronic system according to some example embodiments.

Referring to FIG. 14, an electronic system 4000 includes at least one processor 4100, a communication module 4200, a display/touch module 4300, a storage device 4400 and a memory device 4500. For example, the electronic system 4000 may be any mobile system or any computing system.

The processor 4100 is configured to control operations of the electronic system 4000. For example, the processor 4100 may execute an OS and at least one application to provide an internet browser, games, videos, or the like. The communication module 4200 is configured to perform wireless or wire communications with an external system. The display/touch module 4300 is configured to display data processed by the processor 4100 and/or receives data through a touch panel. The storage device 4400 is configured to store user data. The memory device 4500 temporarily stores data used for processing the operations of the electronic system 4000. The processor 4100 and the storage device 4400 may correspond to the host device 200 and the storage device 300 in FIG. 1, respectively.

The inventive concepts may be applied to various electronic devices and/or systems including the storage device and the storage system. For example, the inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage system comprising:
   a host device configured to provide first input data and second input data; and
   a storage device configured to store the first input data, and to generate calculation result data by performing an artificial intelligence (AI) calculation based on the second input data, the storage device including
   a first processor configured to control an operation of the storage device,
   a first nonvolatile memory configured to store the first input data,
   a second processor configured to perform the AI calculation, the second processor different from the first processor, and a second nonvolatile memory configured to store weight data associated with the AI calculation, the second nonvolatile memory being different from the first nonvolatile memory.

2. The storage system of claim 1, wherein, in response to the second input data being received, the second processor is configured to:
load the weight data stored in the second nonvolatile memory,
perform the AI calculation based on the second input data and the weight data to generate the calculation result data, and
transmit the calculation result data to the host device.

3. The storage system of claim 2, wherein the weight data is used by the storage device and is not transmitted to the host device.

4. The storage system of claim 2, wherein
the weight data represents a plurality of weight parameters that are pre-training parameters and are included in a plurality of layers of a neural network system, and
the calculation result data represents a result of multiplication and accumulation operations performed by the neural network system.

5. The storage system of claim 4, wherein the second processor is a neural processing unit (NPU) configured to drive the neural network system.

6. The storage system of claim 4, wherein the neural network system includes at least one of an artificial neural network (ANN) system, a convolutional neural network (CNN) system, a recurrent neural network (RNN), and a deep neural network (DNN) system.

7. The storage system of claim 1, wherein the storage device is configured to:
store the first input data in a first operation mode, and
perform the AI calculation based on the second input data and the weight data in a second operation mode.

8. The storage system of claim 7, wherein the second operation mode is enabled based on a mode setting signal provided from the host device to the storage device.

9. The storage system of claim 8, wherein the host device includes a plurality of first pins and a second pin, the plurality of first pins configured to exchange the first input data, the second input data, and the calculation result data with the storage device, and the second pin configured to exchange the mode setting signal with the storage device, and
the storage device further includes a plurality of third pins and a fourth pin, the plurality of third pins configured to exchange the first input data, the second input data, and the calculation result data with the host device, and the fourth pin configured to exchange the mode setting signal with the host device.

10. The storage system of claim 7, wherein
a first address for the storage device and a first storage space in the storage device corresponding to the first address are assigned as a special function register (SFR) area, and
the second operation mode is enabled in response to the first address and first setting data being provided from the host device.

11. The storage system of claim 7, wherein the first processor and the first nonvolatile memory are enabled in the first operation mode and are switched to have an idle state in the second operation mode.

12. The storage system of claim 11, wherein the second processor and the second nonvolatile memory have the idle state in the first operation mode and are enabled in the second operation mode.

13. The storage system of claim 12, further comprising:
a triggering unit configured to enable the second processor and the second nonvolatile memory in response to an operation mode of the storage device changing from the first operation mode to the second operation mode.

14. The storage system of claim 11, wherein
the first processor and the first nonvolatile memory are included in a first clock/power domain, and
the second processor and the second nonvolatile memory are included in a second clock/power domain.

15. The storage system of claim 7, wherein the host device is configured to collect a number of the second input data to transmit collected second input data to the storage device in the second operation mode.

16. The storage system of claim 15, wherein an interface between the host device and the storage device is configured to enter a hibernation state while the collected second input data are not transmitted in the second operation mode.

17. A storage device comprising:
a first processor configured to control an operation of the storage device;
a first nonvolatile memory configured to store first input data;
a second nonvolatile memory configured to store weight data associated with an artificial intelligence (AI) calculation; and
a second processor configured to load the weight data stored in the second nonvolatile memory, to generate calculation result data by performing the AI calculation based on second input data and the weight data, and to output the calculation result data.

18. The storage device of claim 17, wherein the first processor and the second processor are formed as one chip.

19. The storage device of claim 17, wherein the first processor and the second processor are formed as two separated chips.

20. A storage device comprising:
a first clock/power domain including a first processor and a first nonvolatile memory, the first nonvolatile memory configured to store first input data in a first operation mode, and the first processor configured to access the first nonvolatile memory;
a second clock/power domain including a second processor and a second nonvolatile memory, the second nonvolatile memory configured to store weight data associate with an artificial intelligence (AI) calculation, the second nonvolatile memory being different from the first nonvolatile memory, and the second processor configured to access the second nonvolatile memory and perform the AI calculation based on second input data in a second operation mode, the second processor being different from the first processor; and
a third clock/power domain including a triggering unit, the third clock/power domain being different from the first and second clock/power domains, the triggering unit configured to enable the first operation mode and the second operation mode, the triggering unit configured to enable the first processor and the first nonvolatile memory to store the first input data and the second processor and the second nonvolatile memory to have an idle state in the first operation mode, and to enable the second processor to load the weight data stored in the second nonvolatile memory, to perform the AI calculation based on second input data and the weight data, and output the AI calculation result data in the second operation mode.

\* \* \* \* \*